United States Patent
Miglietta et al.

(10) Patent No.: US 9,934,786 B2
(45) Date of Patent: *Apr. 3, 2018

(54) SPEECH RECOGNITION AND TRANSCRIPTION AMONG USERS HAVING HETEROGENEOUS PROTOCOLS

(71) Applicant: Advanced Voice Recognition Systems, Inc., Scottsdale, AZ (US)

(72) Inventors: Joseph H. Miglietta, Scottsdale, AZ (US); Michael K. Davis, Phoenix, AZ (US)

(73) Assignee: Advanced Voice Recognition Systems, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/400,732

(22) Filed: Jan. 6, 2017

(65) Prior Publication Data

US 2017/0116993 A1    Apr. 27, 2017

Related U.S. Application Data

(63) Continuation of application No. 14/821,786, filed on Aug. 10, 2015, now abandoned, which is a
(Continued)

(51) Int. Cl.
*G10L 21/00* (2013.01)
*G10L 15/30* (2013.01)
(Continued)

(52) U.S. Cl.
CPC .............. *G10L 15/30* (2013.01); *G06F 17/28* (2013.01); *G06F 17/30746* (2013.01); *G10L 15/265* (2013.01); *H04M 3/4938* (2013.01)

(58) Field of Classification Search
CPC ......... G10L 15/26; G10L 15/30; G10L 15/22; G10L 15/285; G10L 2015/223;
(Continued)

(56) References Cited

U.S. PATENT DOCUMENTS 4,829,576 A    5/1989   Porter
4,914,704 A    4/1990   Cole et al.
(Continued)

FOREIGN PATENT DOCUMENTS

EP    1136983 A1    9/2001

OTHER PUBLICATIONS

"Internetworking Technologies Handbook", Cisco Systems (1999), Chapters 17 X.25 (pp. 1-10), Chapter 30 Internet Protocols (pp. 1-16) and Chapter 35 Apple Talk (pp. 1-22).
(Continued)

*Primary Examiner* — Vijay B Chawan
(74) *Attorney, Agent, or Firm* — Ascenda Law Group, PC

(57) ABSTRACT

A system is disclosed for facilitating free form dictation, including directed dictation and constrained recognition and/or structured transcription among users having heterogeneous native (legacy) protocols for generating, transcribing, and exchanging recognized and transcribed speech. The system includes at least one system transaction manager having a "system protocol," to receive a verified, streamed speech information request from at least one authorized user employing a first legacy user protocol. The speech information request which includes spoken text and system commands is generated using a user interface capable of bi-directional communication with the system transaction manager and supporting dictation applications, including prompts to direct user dictation in response to user system protocol commands and systems transaction manager commands. A speech recognition and/or transcription engine (ASR), in communication with the systems transaction manager, receives the speech information request from the system transaction manager, generates a transcribed response, which can include a formatted transcription, and transmits the response to the system transaction manager.
(Continued)

The system transaction manager routes the response to one or more of the users employing a second protocol, which may be the same as or different than the first protocol. In another embodiment, the system employs a virtual sound driver for streaming free form dictation to any ASR, regardless of the ASR's ability to recognize and/or transcribe spoken text from any input source such as, for example, a live microphone or line input. In another embodiment, the system employs a buffer to facilitate the system's use of ASRs requiring input data to be in batches, while providing the user with an uninterrupted, seamless dictating experience.

23 Claims, 4 Drawing Sheets

Related U.S. Application Data continuation of application No. 13/928,383, filed on Jun. 27, 2013, now Pat. No. 9,142,217, which is a continuation of application No. 13/115,105, filed on May 24, 2011, now Pat. No. 8,498,871, which is a continuation-in-part of application No. 12/497,675, filed on Jul. 5, 2009, now Pat. No. 7,949,534, which is a continuation of application No. 11/824,794, filed on Jul. 3, 2007, now Pat. No. 7,558,730, which is a continuation of application No. 09/996,849, filed on Nov. 27, 2001, now abandoned.

(51) Int. Cl.
  *G06F 17/28* (2006.01)
  *G10L 15/26* (2006.01)
  *G06F 17/30* (2006.01)
  *H04M 3/493* (2006.01)

(58) Field of Classification Search
  CPC ........... H04M 3/4938; H04M 1/72561; H04M 2201/40; H04M 2201/60; H04M 2203/355; H04M 2250/74; H04M 3/42204; H04M 3/44; H04M 3/493; H04M 3/4931; H04M 3/4936; H04L 29/06027; H04L 41/5003; H04L 41/5064; H04L 41/5067; G06F 17/30899; G06F 3/167
  USPC .... 704/270, 270.1, 235, 231, 200, 220, 223, 704/224, 233, 257, 275, 278; 709/228, 709/250, 201, 218, 227, 999.101; 703/17, 703/21, 22
  See application file for complete search history.

(56) References Cited

U.S. PATENT DOCUMENTS

| | | | |
|---|---|---|---|
| 5,031,113 A | 7/1991 | Hollerbauer | |
| 5,220,611 A | 6/1993 | Nakamura et al. | |
| 5,355,472 A | 10/1994 | Lewis | |
| 5,572,643 A | 11/1996 | Judson | |
| 5,799,273 A | 8/1998 | Mitchell et al. | |
| 5,960,447 A | 9/1999 | Holt et al. | |
| 6,167,395 A | 12/2000 | Beck et al. | |
| 6,170,011 B1 | 1/2001 | Beck et al. | |
| 6,292,480 B1 | 9/2001 | May | |
| 6,298,326 B1 | 10/2001 | Feller | |
| 6,311,159 B1 | 10/2001 | Van Tichelen et al. | |
| 6,434,526 B1 | 8/2002 | Cilurzo et al. | |
| 6,449,588 B1* | 9/2002 | Bowman-Amuah | H04L 41/0604 703/17 |
| 6,478,361 B1 | 11/2002 | Wood | |
| 6,748,361 B1 | 6/2004 | Comerford et al. | |
| 6,851,115 B1 | 2/2005 | Cheyer et al. | |
| 6,970,935 B1* | 11/2005 | Maes | H04L 29/06027 370/356 |
| 7,137,126 B1* | 11/2006 | Coffman | G06F 17/30899 704/200 |
| 7,529,675 B2* | 5/2009 | Maes | G10L 15/30 704/270.1 |
| 7,558,730 B2* | 7/2009 | Davis | G10L 15/26 704/235 |
| 7,606,712 B1* | 10/2009 | Smith | G06F 3/167 704/270.1 |
| 7,949,534 B2* | 5/2011 | Davis | G10L 15/26 704/10 |
| 8,131,557 B2* | 3/2012 | Davis | G10L 15/26 704/10 |
| 8,498,871 B2* | 7/2013 | Miglietta | G10L 15/26 704/10 |
| 9,142,217 B2* | 9/2015 | Miglietta | G10L 15/26 |
| 2002/0143874 A1 | 10/2002 | Marquette et al. | |
| 2002/0156900 A1 | 10/2002 | Marquette et al. | |
| 2002/0184373 A1* | 12/2002 | Maes | G06F 9/445 709/227 |
| 2003/0088421 A1 | 5/2003 | Maes et al. | |
| 2003/0101054 A1* | 5/2003 | Davis | G10L 15/26 704/235 |
| 2006/0041431 A1* | 2/2006 | Maes | G10L 15/30 704/270.1 |
| 2007/0043574 A1 | 2/2007 | Coffman et al. | |
| 2007/0250317 A1* | 10/2007 | Davis | G10L 15/26 704/235 |

OTHER PUBLICATIONS

A.Cheyer, D. Martin. "The Open Agent Architecture." Autonomous Agents and Multi-Agent Systems, 4, 143-148, 2001.
D.L. Martin, A.J. Cheyer and D. B. Moran, "The Open Agent Architecture: A Framework for Building Distributed Software Systems". Applied Artificial Intelligence, 1998, vol. 13, 6 pages.
D.L. Martin, A.J. Cheyer. "Building Distributed Software Systems with the Open Agent Architecture." Proc. of the Third International Conference on the PAAM 1998, 73 pages.
D.Martin, A. Cheyer. "Building and Using Practical Agent Applications." SRI International PAAM 1998 Tutorial. SRI International. 1998, 78 pages.
Fiuczynski; et al., "The Design and Implementation of an 1Pv6/1Pv4 Network Address and Protocol Translator", Proceedings of the USENIX Annual Technical Conference (No. 98), New Orleans, LA, Jun. 1998, pp. 1-11.
Tanenbaum, Andrew S., "Computer Networks", Prentice-Hall Software Series, 1981, pp. 7-21.
Winarsky; et al., "The Development of Siri and the SRI Venture Creation Process", Siri Caltech Case HK, Bill, Norman v. 11.5., Technical report (2012), SRI International, Menlo Park, USA, 20 pages.

* cited by examiner

SPEECH RECOGNITION AND TRANSCRIPTION AMONG USERS HAVING HETEROGENEOUS PROTOCOLS

CROSS-REFERENCE TO RELATED APPLICATIONS

The present application is a Continuation-In-Part application of U.S. application Ser. No. 12/497,675 filed Jul. 5, 2009 for "SPEECH RECOGNITION AND TRANSCRIPTION AMONG USERS HAVING HETEROGENEOUS PROTOCOLS," now U.S. Pat. No. 7,949,534, which is a Continuation application of U.S. application Ser. No. 11/824,794 filed Jul. 3, 2007 for "SPEECH RECOGNITION AND TRANSCRIPTION AMONG USERS HAVING HETEROGENEOUS PROTOCOLS," now U.S. Pat. No. 7,558,730, which is a Continuation application of U.S. application Ser. No. 09/996,849 filed Nov. 27, 2001 for "SPEECH RECOGNITION AND TRANSCRIPTION AMONG USERS HAVING HETEROGENEOUS PROTOCOLS" (now abandoned).

BACKGROUND

The present application relates to electronic speech recognition and transcription; and, more particularly, to processes and systems for facilitating "free form" dictation, including directed dictation, constrained recognition and/or structured transcription among users having heterogeneous system protocols. The grandparent application Ser. No. 09/996,849, which is herein incorporated by reference, presents a system and processes for facilitating electronic speech recognition and/or transcription among users having heterogeneous system protocols.

As set forth in the parent application, networked application service providers (ASPs) are the most efficient way to utilize sophisticated speech recognition and/or transcription engines having robust dictionaries and vocabularies for large scale users, especially in the professions. The networked application service provider (also known as "on-demand" software or software as "a service") interconnects application software to high accuracy speech recognition and/or transcription engines which may exist on a centralized specific server application; or, one of the facilities in a peer-to-peer network computing (peer node); or, networking as a distributed application architecture that partitions tasks and/or workloads between peers to form a peer-to-peer network, as well as the "cloud" computing network configuration.

However, a barrier to implementation of these networked systems is the user's use of internal "business" and/or system protocol (legacy protocols), which include, in many cases, both unique native communications and application protocols. These protocols are marked by their unique interface with the entities system and/or organization, and are, therefore, not universal in their interconnect capabilities or their application. Thus, most network systems are unavailable to users employing legacy or native systems.

As set forth in the parent and grandparent applications, seamlessly interfacing with network application service provider software that enables powerful speech recognition and/or transcription engines to interface with legacy systems is required in order for these legacy systems to interface effectively with robust network based systems. Centralized databases (or uniformly accessible databases) that contain information for a number of users, including the wide spread availability of specific vocabularies which include phraseology, grammar, and dictionaries, as well as formatting structures for users of the system, are usually more efficient than a network of mere direct, point-to-point links between individual users.

But universally available recognition databases, including vocabulary databases and dictionaries, suffer from significant inefficiencies in facilitating communications between users of a more centralized database system, especially if the dictation to be transcribed is "free form" or dynamic. Even though a recognition engine is very accurate in spoken word (speech) recognition, the transcription may be filled with transcribed material which is "out of context," misinterpreted or not formatted correctly. Simply stated, "garbage in—garbage out."

Thus, even though engine providers advertise in terms of recognition and transcription accuracy, the real issue with these robust engines is ease of use (user friendliness); and, the direct usability of the transcribed material without extensive editing, correcting and/or reformatting. Perhaps most significantly, the content of a single database rarely contains every user's required information, even when that database specializes in information regarding a particular field or expertise, e.g. medicine.

A system for facilitating the exchange of speech (which includes spoken text and verbal and non-verbal commands) and information among users having heterogeneous and/or disparate internal system protocols, which is safe, secure, and easy to use, was set forth in the parent and grandparent applications. However, seamless use of automated speech recognition and/or transcription engines (ASRs) by one or more networked application server providers (ASPs) presents a system restriction which is inherent to this configuration. Even though, the remotely located ASRs are more robust and provide for use of larger and more diverse dictionaries and vocabularies, including specific dictionaries, the ability of a remote user to properly select the needed system information for a specific application is restricted and complicated. This is especially true when ASRs and/or different aspects of a single vocabulary or a specific dictionary need to be selected "on the fly," i.e. dynamically, or during a "free form," streamed dictation session, or in response to a streamed, prerecorded session.

When a particular "free form," streamed dictated session requires access to a myriad of specialized functions, such as medical information, which must serve a number of specialized purposes, these system restrictions may overshadow the usefulness of networked robust ASRs. Similar restrictions are present on these remote robust ASRs, especially when certain formatting and vocabulary are necessary for very specialized application or functions, which form a portion of otherwise normal dictation.

Although some prior art systems contain "drop down menus" which can be populated and thus create documents with predetermined word lists and/or short phrases for the system, these systems contain inherent restrictions and interruptions in the dictating session which limit the required functionality for "free form," streamed dictation. That is, these menus/lists do not provide the flexibility to accept the streaming of dictated sentences and phrases, including jargon, normally associated and/or recognized by practitioners and/or paraprofessional or administrative personnel in a specific trade or profession such as, for example, medicine or law.

Thus, populating drop down menus/lists with predetermined single words or short phrases has not proven adequate for these higher functionality uses and unduly constrains the speaker and/or interrupts his/her train of thought. Additionally, these types of drop down menus/lists are more easily populated by an administrator on a keyboard or with a mouse; and, do not require the capability or sophistication of a centrally controlled transcription system and robust recognition and/or transcription engines (ASRs). An example of complex, "free form" dictation is a surgeon dictating notes during an open heart procedure or a radiologist reading an X-ray film or an MRI scan.

Previous attempts to expand the flexibility of centrally controlled systems were to create large "user files" or databases which could be accessed only by a single user. These user files contained the needed "user profile" for dictation, as well as the user specific vocabularies or dictionaries for the ASRs. Thus, all the capability of the system for a single user had to be pre-stored for that user alone. This limited the amount of new indexed data generally accessible to a specific user, as well as the flexibility of using ASRs and/or dynamically ("on the fly") switching to specialized vocabularies as needed or directed by the user or the system. That is, general databases, for example, dictionaries, could not be universally updated without the necessity of updating each individual user's database associated with each specific ASR. Further, as these databases grew, the ability to navigate the different capabilities of these large databases in a short time frame ("on the fly") became limiting, especially during "live," complex transcription that required the ASR to dynamically switch among vocabularies of multiple specialties to obtain optimum recognition accuracy and/or with multiple speakers such as, for example, legal depositions. This made certain uses impossible such as, for example, in a court room setting or in an operating theater.

Moreover, previous systems did not provide dynamic system interface between the automated speech recognition and/or transcription engine (ASR) and the legacy user such that the system could prompt the user to focus the dictation to provide a more structured set of recognition rules and/or a constrained recognition and/or a structured transcription. Such systems required cumbersome human machine (system) interface requiring the user to, for example, pause in order to "command" or instruct the system to accommodate the different scenarios; and, then pause until the system could locate and upload the database required to respond.

Additionally, certain recognition/speech engines, by design, process audio files on a "batch bases." Although a design limitation, not related to the accuracy or the speed of the engine, this constraint, heretofore, foreclosed certain applications, including limiting their capability to transcribe streamed dictation to an amount of information accepted by the recognition engine in a single batch. Other speech engines are only compatible with dictated text from a specific source such as, for example, live microphone or line input. This inhibits the ability of these engines to operate with digital systems or systems which digitize speech into data packets for system identification and processing. Thus, even though the capability was provided to access networked and remote functionality, the complete value of this capability was hindered by these inherent limitations.

SUMMARY

A method and system for facilitating Free Form Dictation, including Directed Dictation and Constrained Recognition and/or Structured Transcription among Users having heterogeneous native (legacy) protocols is provided. The System includes at least one System Transaction Manager running on a microprocessor having a "system protocol," adapted to receive a verified, streamed Speech Information Request (SIR) from at least one authorized User employing a first legacy User protocol, and Routing a Response configured in a second legacy User protocol to one or more Users that employs a second legacy User protocol.

The Speech Information Request (SIR) is comprised of Free Form Dictation, which can be Directed Dictation, which is live dictation or from a previously recorded session, which contains spoken text for transcription and Commands (Speech), including Audio and Non-Audio Commands, for directing the production of Constrained Recognition and/or Structured Transcription; and, the Response is comprised of a transcription of the spoken text, including Formatted Transcription, in response to Commands whether from the SIR, the System, or the Automated Speech Recognition and/or Transcription Engine (ASR). The System Transaction Manager, using a system protocol, is in communication with all components and/or elements of the System to enable Users to experience uninterrupted seamless Free Form Dictation using their own legacy User protocol.

The System includes at least one Automated Speech Recognition and/or Transcription Engine (ASR) which can have a legacy engine protocol in communication with the System Transaction Manager for receiving the Speech Information Request (SIR) containing the Directed Dictation, as well as System generated Commands from the User and/or the System Transaction Manager which are processed by the Automated Speech Recognition and/or Transcription Engine (ASR) to Constrain Recognition and generate Structured Transcription in Response to the SIR; and, for transmitting the structured transcribed Response to the System Transaction Manager.

In one aspect of the System, at least one Application Service Adapter (ASA) configured to provide bi-directional transmission between the first legacy User protocol and the System Transaction Manager's uniform system protocol and between the second legacy User protocol and the System Transaction Manager's uniform system protocol is provided. A Speech Recognition Service Adapter (SRSA) is utilized to provide, when required, bi-directional translation between the System Transaction Manager's uniform protocol and the ASR's native engine protocol. A first legacy User protocol can be the same as or different than the second legacy User protocol.

The System components, including the System Transaction Manager and the ASR, can reside in a single location or the functionalities can be distributed throughout the Internet as in "cloud" applications or be included as a Peer Node in peer-to-peer networks which share functionalities by and through the System Transaction Manager. The ASR can reside on a remote Speech Recognition and/or Transcription Server (SRTS) or at one or more "nodes" in a peer-to-peer configuration or within the "cloud" and is in communication with the System Transaction Manager through the network.

Directed Dictation can be provided directly by the User during a session by structuring the User Interface Device so as to prompt the User to constrain his dictation to specific subject matter and/or content; or, it can be provided by the legacy User application or the System responding to the User's specific use of fields or segments of the User Interface Device or visual or audio prompts generated by the legacy User system applications running on the legacy User Interface Device. The legacy User Interface Devices can include remote stations, e.g. PDAs, cell phones, phones, tablets, PCs, digital recorders, analog recorders, and Internet devices; and/or, Directed Dictation can be provided by employing communication between the legacy User interface and the System Transaction Manager such that the System Transaction Manager prompts the User to dictate using a specific format and/or vocabulary either by prompt from the User Profile or in accordance with a predetermined User structured instructions and/or from actions of a User such as selection of a field on the User interface which instructs the System Transaction Manager to select a specified Constrained Recognition and/or Structured Transcription associated with a specific ASR.

In one embodiment, the System employs a Buffer function to facilitate Free Form Dictation, including the System's use of batch Automated Speech Recognition and/or Transcription Engines (ASRs) and/or Constrained Recognition and/or Structured Transcription, while providing the User with an uninterrupted, seamless dictating experience.

In another embodiment, the System employs a Virtual Sound Driver for streaming Free Form Dictation to any ASR, regardless of the ASR's ability to recognize and/or transcribe spoken text only from, for example, a live microphone or line input. The System Transaction Manager sends spoken text to the ASR by way of the Virtual Sound Driver. The Virtual Sound Driver outputs the spoken text in a data format which simulates or mimics that of the input from, for example, live microphone or line source. This results in the ASR, upon receiving the spoken text from the Virtual Sound Driver, processing it as if it were generated by, for example, a live microphone or line source, regardless of the actual originating source.

A method for facilitating Free Form Dictation, including Directed Dictation and Constrained Recognition and/or Structured Transcription among Users having heterogeneous system protocols is also provided. The method comprises generating an authorized Speech Information Request (SIR), which is either live or pre-recorded, obtained through a first legacy User protocol, the Speech Information Request (SIR) comprised of Directed Dictation; translating the first legacy User protocol to the uniform System protocol used by a System Transaction Manager; transmitting the translated Speech Information Request (SIR) through the System Transaction Manager that directs the SIR to an Automated Speech Recognition and/or Transcription Engine (ASR); generating a Response to the SIR, including transcription of spoken text using the ASR; the Response comprised of Structured Transcription of the spoken text; translating the uniform System protocol to a second legacy User protocol, which may be the same as the first; and, transmitting the Response to a User via the System Transaction Manager to provide the Recipient User with a transcription of the spoken text, including a Formatted Transcription, if required.

DETAILED DESCRIPTION

Nomenclature

Figure 1:
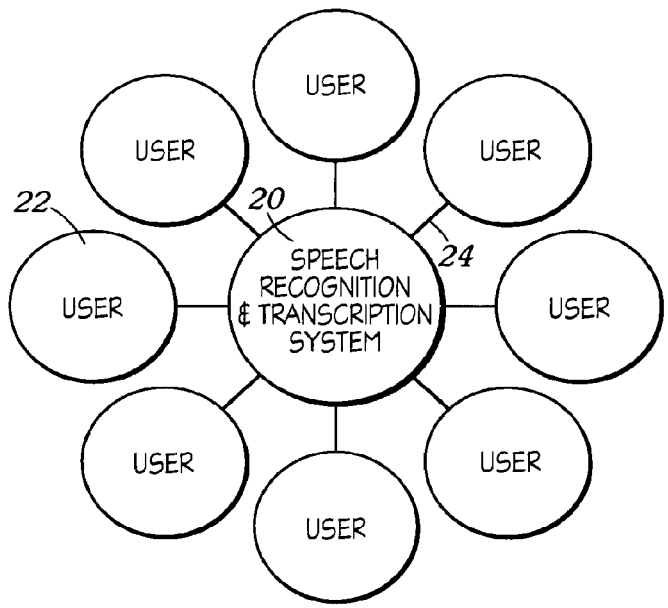
FIG. 1 is a schematic drawing showing a networked ASP configuration among Users for facilitating Speech recognition and/or transcription.

The following terms and general definitions are used herein to describe various embodiments of a Speech Recognition and Transcription System (the "System").

Applications Programming Interface (API) shall mean a set of services or protocols provided by an operating system to applications (computer programs) running on microprocessors, as well as a set of services the Application Service Adapter (ASA) provides to Native Application Protocols. The API may provide services or protocols geared to activities of a particular industry or group, such as physicians, engineers, lawyers, and the like.

Application Service Adapter (ASA) shall mean the application that provides the bi-directional interface between a legacy User protocol and the System Transaction Manager's uniform System protocol. The ASA provides those aspects required by legacy application in order to make use of Directed Dictation, including monitoring the User Interface Device for changes in output, for example, changes in caret position, and conveying the relative information to the System Transaction Manager, as well as the Constrained Recognition and/or Structured Transcription of an ASR, as well as interface among disparate Users by allowing a User's existing Native Application Protocol and/or Native Communications Protocol to communicate with the System Transaction Manager, and ultimately, a specific Automated Speech Recognition and/or Transcription Engine (ASR).

Application Service Provider (ASP) or Network Application Service Provider shall mean functionality or an entity that provides computer-based services to customers over a network, including interconnecting application software to high accuracy, speech recognition and/or transcription engines which may exist on a centralized specific server application; or, one of the facilities (Peer Node) in a peer-to-peer network; or, networking as a distributed application architecture that partitions functionality, tasks, or workloads between peers to form a peer-to-peer network of nodes, as well as the "cloud" computing network configuration. In one aspect, ASPs provide access to a particular application program using a standard protocol such as HTTP, HTTPS, and the like.

Audio Data shall mean sounds, which are audible and non-audible, including verbal, tones, clicks, and pauses distinguishable by the System from spoken text and usually the basis of an Audio Command. This Audio Data can be generated by utterances from the User or tactile generated by, for example, depression of a tone key on a mobile phone. The Audio Data is contained in an audio file.

Audio Preprocessor shall mean a processor capable of detecting Audio and Non-Audio Commands in streamed Speech, including verbal Commands and non-verbal Commands. For example, tones, clicks, silence, or simple numeric patterns of strings, as well as verbal Commands from the streamed text. Depending on the System action associated to the detected Command, the Audio Preprocessor also segments the spoken text based upon Commands such that segments are able of separate and distinct processing by the System.

Automated Speech Recognition and/or Transcription Engine (ASR) shall mean a process running on a microprocessor that recognizes spoken text and certain ASR directed Commands and performs Constrained Recognition and/or Structured Transcription of this spoken text in accordance with instructions from the System Transaction Manager and Audio and Non-Audio Commands.

Buffer shall mean a buffer function such as a temporary storage or retention device able of dynamically accumulating and/or storing streamed data submitted by a User to allow the System Transaction Manager to perform System's functions seamlessly without loss of streamed User information and/or to allow ASR to perform Constrained Recognition and/or Structured Transcription functions seamlessly without loss of streamed User information, while the User perceives no disruption in Free Form Dictation.

Command shall mean any type of prompt on User's application and/or contained (Embedded) in a streamed dictated Speech (audio file), including Directed Dictation, which is recognized by the System as an instruction for controlling and/or configuring a System component, but is not included in the text to be transcribed. For example, Commands instruct the System on Formatted Transcription of the recognized/transcribed spoken text from an ASR and can also instruct the disposition of a Response. For example, a Command might instruct the System to place the recognized/transcribed spoken text into a specified Microsoft® Word format; or, a Command might instruct format of the recognized/transcribed spoken text into segments in order to populate a template in a Microsoft® Word format. Commands of many types, e.g. Audio Commands and Non-Audio Commands, can be detected by the System Transaction Manager, the ASR, or various pre- and sub-components of the System. Audio Command shall mean a Command consisting of any Audio Data or signal in the streamed Speech which is distinguishable by the System from the spoken text. Non-Audio Commands shall mean Commands Embedded into the audio file which are not part of the Audio Data and can be encoded by means such as interleaving. Non-Audio commands can also be System generated, for example, in response to the input focus of Directed Dictation and can be contained in the non-audio portion of the audio stream (Meta Data) to direct, for example, the ASR. Spoken Command shall mean a special Audio Command and generally includes verbiage having special meaning to the User application and/or one or more components of the System but is not spoken text. A Spoken Command can include verbalized words or phrases uttered by the User during streamed dictation and Embedded into the Speech (audio file). Tactile Commands shall mean Commands generated from the keyboard, mouse, foot pedal, microphone keys, and the like and can be audio as a touch tone phone; or, non-audio as in an electronic key stroke. A Tactile Command can also include touch screen applications or positioning on a visual template, including eye-tracking software.

Constrained Recognition shall mean recognition by the Automated Speech Recognition and/or Transcription Engine (ASR) which is constrained to the use of specific dictionaries and/or vocabularies or the like by the System Transaction Manager through interaction with the legacy User Interface Device and/or a remote station and/or User interface actions and/or User Profile settings or the like in the User Database to enhance recognition accuracy and/or Dictation Context and/or transcription formatting.

Correctionist shall mean a designated operator within the System for correcting the transcribed text produced by an ASR.

Correctionist Pool shall mean a pool of Correctionists having particular programming applications/capabilities, including, for example, skills for correcting legal, medical, and engineering documents within the System Transaction Manager.

Database shall mean an indexed data repository, which indexed data may include previously transcribed Free Form or Directed Dictation. Databases include User Databases which are unique to a specific User, including the User Profile and can include User specific pre-programmed System responses to Commands for specifying spoken text to the System Transaction Manager to facilitate Directed Dictation for a specific User or group of Users; a System Database operated upon by the System Transaction Manager containing general System responses to Commands, including User Profiles, as well as the application pre-programmed Responses to the Commands related to the legacy User protocol and specific prompts, application, templates, and the like needed to facilitate Free Form Dictation from the User; and, a Universal Database which is associated with Constrained Recognition and/or Structured Transcription such as a dictionary or vocabulary and/or Directed Dictation containing generic or specific prompts, templates, and the like to facilitate Free Form Dictation available for all Users, or a specific group of Users of the System; and, an ASR Database which is associated with the ASR through, for example, the SRSA and contains information including User Profile, vocabularies/dictionaries and the like required by the ASR to process the SIR.

Dictation Context shall mean a change in the context of the dictation (Constrained Recognition and/or Structured Transcription) of the spoken text in response to Commands, which are usually Non-Audio Commands.

Directed Dictation shall mean Free Form Dictation of Speech in a manner to enhance recognition accuracy by identifying differing types of Speech as initiated by the User and/or the System Transaction Manager and/or User interface, including remote devices, which encompasses Free Form Dictation (either live or recorded), wherein Commands, either on User Interface Device, for example, a programmed PDA; or, prompted by communication with the System Transaction Manager, prompt the User to dictate on a specific topic and/or utilize a specific vocabulary or otherwise limit the subject matter or the context of the spoken text so that the content is limited and/or the format structured by the System, including the ASR, prior to entry into the Correctionist Pool and/or final document formatting. For example, a medical interface may prompt the User to dictate a "patient history," and, then, when focus is shifted to the diagnosis by, for example, a User Interface Device prompt, the User is reminded to dictate the "diagnosis". Additionally, the User, by selection of a particular field or grid on the User Interface Device, such as "prognosis," commands the System Transaction Manager to instruct the ASR to load a selected Constrained Recognition containing vocabularies and/or dictionaries associated with "prognosis" for standard ASR process with selected vocabulary and/or Structured Transcription of the subsequent spoken text.

Embedded Command shall mean a Command encoded into a Speech stream (audio stream) entered at the User interface either directly by dictation or pre-programming in a legacy User application or prompted to the User by the System Transaction Manager; or as a Non-Audio Command encoded by one or more components of the System.

Enrollment shall mean the process of creating a set of interface data for a particular User with one or more Automated Speech Recognition and/or Transcription Engines (ASRs) to establish a recognition interface between the specific User and ASR to provide accurate transcription.

Extensible Markup Language (XML), VOICE Extensible Markup Language (VXML), and Standardized Generalized Markup Language (SGML) shall mean self-defining data streams that allow embedding of data, descriptions using Commands, tags and formatting. XML is a subset of SGML.

Formatted Transcription shall mean the formatting of the spoken text transcribed by a System component, for example, a Speech Recognition Service Adaptor (SRSA), in response to a Command. For example, formatting may involve placing the transcribed spoken text into a Microsoft® Word document with file name. Transcription formatting may refer to the internal representation of transcribed Speech within the System (data structure), or to the external representation of the transcribed Speech when viewed by Users (visual appearance), or to both, or may be used to populate designated areas of, for example, a form document.

Free Form Dictation shall mean streamed Speech uninterrupted by pauses required for the System Transaction Manager to access System speech transcription and/or recognition functions wherein the spoken text is a word stream which imparts a thought or concept to the listener or reader in contrast to words or stock phrases and verbiage used to populate the cells in a form or a drop down menu.

Job shall mean all information contained in a single Speech Information Request (SIR) which can be authenticated by a User ID which is treated by the System Transaction Manager as a single unit of information under a common system identification number even if the Speech is in the form of a continuous stream (Free Form Dictation) rather than a batch.

Meta Data shall mean a segment or block of data used by the System which contains Commands, header data, security data, and identification/verification data. For example, a Resource Interchange File Format (RIFF) which is a meta-format for storing labeled chunks of data.

Native Application Protocol shall mean a protocol, which a User employs to support interaction with Speech Information Requests (SIRs) and Responses and is native to the legacy User protocol.

Native Communications Protocol shall mean a communications protocol that the User employs to support communication within its legacy system. For many transactions, a User employs the Native Communications Protocol and the Native Application Protocol to access its core processes, in total the legacy User's legacy protocol.

Peer Node shall mean a component, a function, or a layer existing on a User station in a peer-to-peer network accessible by at least the System Transaction Manager to perform System functions which components can include an Automated Speech Recognition and/or Transcription Engine (ASR).

Pre-existing Public Communication System shall mean a communications link that is accessible to Users and can support electronic transmission of data. An example includes the Internet, which is a cooperative message-forwarding system linking computer networks worldwide.

Real Time shall mean the streaming of information including dictated Speech by a User.

Real Time Speech Information Request shall mean a User whose SIR transactions operate at the highest priority to allow for Real Time transcription of Speech or at least a streaming of the SIR. When the System Transaction Manager receives a Real Time SIR, it immediately locates an available ASR capable of the request and establishes a bi-directional bridge whereby spoken and transcribed text can be directly exchanged between a User and an ASR in Real Time or near Real Time.

Recipient or Receiving User shall mean a User that receives a transcription of a Job or portion thereof.

Requestor or Requesting User shall mean a User that submits Speech for transcription or a request for transcribed Speech within the System.

Response to a Speech Information Request (SIR) shall mean transcribed spoken text, and Structured Transcription, including Formatted Transcription of transcribed spoken text, and System generated Commands for processing the spoken text, for example, on the legacy User interface.

Routing shall mean the process of transferring Speech, prompts, and templates that can employ either push technology or pull technology, where "push" refers to the Requestor initiating the transfer and "pull" refers to the Recipient or the System initiating the transfer in response to a Command.

Speech shall mean spoken text and Audio and Non-Audio Commands, which the System can operate upon to provide a transcription of the spoken text, including a Formatted Transcription.

Speech Information Request (SIR) shall mean Speech, which can be acted upon by System components, including the System Transaction Manager, to provide a transcription of the spoken text, including a Formatted Transcription.

Speech Recognition Service Adapter (SRSA) shall mean an application service adapter layer that communicates with the Automated Speech Recognition and/or Transcription Engine (ASR) through the combined vendor independent ASR interface/vendor specific ASR interface and retrieves data from the ASR Database, including User Profile, vocabularies/dictionaries and the like required by the ASR to process the SIR. The SRSA can perform formatting transcription to yield a Formatted Transcription.

Speech Recognition and Transcription Server (SRTS) shall mean a server application within the System, typically running on a separate microprocessor and encompassing any number of ASRs. The SRTS interfaces multiple ASRs with other System components through multiple links. Each link maintains a Job queue from the System Transaction Manager through one or more SRSAs. The SRSA typically includes two adapters, an Audio Preprocess Adapter and a Speech Recognition Service Adapter (SRSA).

Structured Transcription shall mean transcription of spoken text by the ASR which can be constrained to the use of specific dictionaries, vocabularies, or the like by the System Transaction Manager in response to User Commands, e.g. Directed Dictation or System generated Commands such as from a User Profile to enhance transcription context. Structured Transcription can be processed through Constrained Recognition by a specific ASR which transcription can be formatted (Formatted Transcription.) For example, Directed Dictation associated with a field in a Microsoft® Word medical form for "diagnosis," Commands the System Transaction Manager to initiate Constrained Recognition using a "diagnosis" vocabulary and subsequently use Structured Transcription to structure the transcribed spoken text associated with the identified Directed Dictation in Microsoft® Word format inserted into the appropriate medical form field for "diagnosis."

Subscriber shall mean an entity, whether a User or not, which is authorized to employ transactions on the System.

System Transaction Manager shall mean a System's application that provides a central interconnect point (hub) and a communications interface among System components and Users having disparate or heterogeneous protocols; and, an information router (or bridge or switch) within the System that manages the scheduling/routing of Jobs/audio streams, the proper Automated Speech Recognition and/or Transcription Engine (ASR) selection, and managing of User Profiles and processing of feedback of Command actions, as well as the Speech Information Request (SIR) and the Response.

Updating a User Profile shall mean a User Profile update from documents, dictionaries, Commands, pronunciation files, and further User training for the purpose of improving recognition accuracy and updating Databases containing specific User Commands.

User shall mean an entity that uses services provided by the System. A User may also be a Subscriber.

User Identification (ID) shall mean a System identifier, which is used to uniquely identify a particular User and its legacy protocol.

User Interface Device shall mean a device (hardware and software) which provides the human machine interface between the User and the System. User Interface Device is part of the legacy User system.

User Profile shall mean a dataset generated by a User enrolling on a specific ASR and required by an ASR to process User's Speech recognition. The User Profile includes User specific dictionaries, Commands, pronunciation files, User Command Database, and the like.

User Service Adapter shall mean a specific Application Service Adapter (ASA) that handles formatting and Routing of Speech Information Requests (SIRs) and Responses to elements of a User's protocol within the System.

Virtual Sound Driver shall mean a System device or application which facilitates the use of ASRs regardless of the ASR's ability to recognize and/or transcribe spoken text from any input source such as, for example, a live microphone or line input. The output of the spoken text from the Virtual Sound Driver is in a data format which simulates or mimics that of the input from any input source such as, for example, a live microphone or line source. This results in the ASR, upon receiving the spoken text from the Virtual Sound Driver, to process it as if it were generated by any input source such as, for example, a live microphone or line source, regardless of the actual originating source.

Overview

Processes, methods and systems herein disclosed and claimed facilitate Free Form Dictation, including Directed Dictation, as well as Constrained Recognition and/or Structured Transcription among Users having heterogeneous System protocols (legacy User protocol). The System comprises computer based components, some of which run on a microprocessor(s), including indexed Databases and User Interface Devices application and protocols. Broadly, the System and methods disclosed herein provide for seamlessly providing Commands (Audio and Non-Audio) (System or User generated), including those generated as part of Directed Dictation, which can be live (streamed) or stored, allowing disparate Users to selectively use and command robust ASRs using Free Form Dictation, while experiencing no system delay or dictation interruption for System input of the SIR and Response when using a legacy User protocol.

A System Transaction Manager identifies Commands in the User streamed or stored dictation; and, if necessary, causes the Speech stream to be "buffered" or otherwise paused and "rewound", in order to execute the Commands and thereby transcribe the spoken text through very robust ASRs using Constrained Recognition in a seamless manner without perceived interruption of the dictating session by the User. The System provides seamless Constrained Recognition and Structured Transcription, including Formatted Transcription of spoken text and other information among legacy Users, while utilizing different indexed Databases and ASRs to interoperate complex Commands and uses stored data, "on the fly," to structure the transcription and otherwise frame and cull the transcribed product such that it requires less User and/or Correctionist time to "clean up" the product. Not only is the instant System more "user friendly," it reduces the human interface time required to render the transcribed product usable even by way of disparate legacy User systems.

The System thus provides seamless recognition and/or transcription of Free Form Dictation, including Directed Dictation; and, access among Users of verbal streamed and/or transcribed spoken text and/or other information, wherein the initiation of Directed Dictation can be either User interface or System directed. By means of Commands (Audio and Non-Audio), which are acted upon by the System Transaction Manager and/or the ASR, the System provides the legacy User a streamed, seamless interface dictation experience, while utilizing multiple and various highly functional and robust Automated Recognition and/or Transcription engines (ASRs), as well as structured vocabularies and dictionaries, which include providing information from various indexed Databases, including User Databases and Universal Database. An authorized User, using a legacy User protocol, can seamlessly access User Profiles, Subscriber information, as well as affecting changes in response to Commands, including ASRs, vocabulary, dictionaries, and Directed Dictation prompts and templates, as well as Enrollment, including seamlessly Updating the User Profile.

The System further provides for authorized legacy Users and or Subscribers to access the System and route the transcribed spoken text (Response) to another User (authorized or not) or back to itself. Thus, the User can seamlessly dictate (Free Form); receive transcription (Response), including Formatted Transcription, in accordance with the Commands and Routing by the System to a designated Recipient, irrespective of the disparity of the legacy User protocol and/or the System protocol.

The System, which can generally be classified as an ASP, comprises a System Transaction Manager running on a microprocessor for receiving a verified, streamed Speech Information Request (SIR) from at least one verified User, who also may be a Subscriber. The entry of such SIR opens a Job. The SIR can take the form of Directed Dictation containing spoken text and/or other information to be obtained or transcribed and disseminated to other Users on the System, or a request for previously transcribed Speech and/or other information assessable to the System, such as a User Profile.

A Speech Information Request (SIR) comprises Free Form Dictation which can be Directed Dictation (which includes spoken text and Audio and Non-Audio Commands) using a first legacy User protocol which may be processed through an ASA to the uniform System protocol. The System Transaction Manager upon receipt of the SIR creates a Job and in accordance with contained and stored Commands to configure the System to process the Job, including the requirement for Directed Dictation and/or Constrained Recognition and/or Structured Transcription through prompts and/or templates stored within a Database or on the legacy User system, process the SIR.

The System Transaction Manager, which in communication with all System ASRs, generates a Speech Information Request (SIR) in a uniform System protocol which is processed, if needed, through an SRSA and forwarded to the Automated Speech Recognition and/or Transcription Engine (ASR). The ASR, upon receiving the Speech Information Request (SIR) from the System Transaction Manager, generates a transcription of the Speech which is returned in the form of a transcribed Response. If there is a requirement for Constrained Recognition and/or Structured Transcription, the ASR is directed to load a specific vocabulary, and/or dictionary for recognition and transcription either by the System Transaction Manager or Embedded Command in the Speech directed at the ASR. The SIR contains Commands which instruct the System, dynamically, regarding Constrained Recognition and/or Structured Transcription. These Commands are either acted upon by the System Transaction Manager or the designated ASR depending upon the Commands.

The transcribed Response is transmitted to the System Transaction Manager through the Speech Recognition Service Adapter (SRSA), if necessary, which routes the Response to one or more of the Users, including, without limitation, the User that generated the SIR employing a second legacy User protocol, which may be the same as, or different than, the first legacy User protocol. If a Formatted Response is required, the System Transaction Manager directs a post-processing System component to format the transcribed spoken text in accordance with the specified Command to produce the Formatted Dictation.

The System Transaction Manager utilizes a uniform System protocol for processing the SIR and the transcribed Response. Subscribers to the System (who may also be Users) have identifying codes, carried in Meta Data which are recognizable by the System for authorizing a System transaction to create a Job. Thus, for System security and/or billing purposes, at least one Subscriber through the Subscriber's (User's) ID is required by the System to be involved in creating a Job.

In accordance with the instant method for exchanging transcribed spoken text and or information captured by Free Form Dictation which includes Directed Dictation, among Users who may employ disparate legacy User protocols, a Speech Information Request (SIR) is generated and/or a request for previously transcribed speech and/or other information through a first legacy User protocol and conveyed to the System Transaction Manager. The SIR is transmitted to the ASR through the System Transaction Manager using a Speech Recognition Service Adapter (SRSA) compatible with an ASR. The method also includes generating a transcribed Response to the SIR, using the ASR and transmitting the transcribed Response to a User via the System Transaction Manager, including a Constrained Recognition and/or Structured Transcription, if required, and providing the User with the transcription from the ASR or a Formatted Transcription from, for example, the SRSA. The Response is compatible with a second legacy User protocol that may be the same as or different than the first legacy User protocol.

According to the method, the Speech Information Request (SIR) which can include a request for previously transcribed speech and/or other information is generated using a first User (Application) Service Adapter (ASA.) The method includes transmitting the SIR to a Speech Recognition and/or Transcription Engine (ASR), which may have yet a different Speech recognition protocol through a Speech Recognition Service Adapter (SRSA) via a System Transaction Manager and generating a transcribed Response to the Speech Information Request (SIR) using the ASR. The Formatted Transcription Response to the Speech Information Request (SIR) is transmitted to the System Transaction Manager via the SRSA and the Formatted Transcription Response is returned to the System Transaction Manager. The System Transaction Manager using a second ASA, conveys the Formatted Transcription to the User included in the Response through a separate User Service Adapter. The Response containing the Formatted Transcription so transmitted is compatible with a second User protocol that may be the same as or different than the first User protocol.

Turning to the Figures, there is shown in FIG. 1 a schematic drawing showing the System as an Application Service Provider (ASP) or Network Application Service Provider, which provides computer-based services to Users over a network, including interconnecting application software to high accuracy ASRs, including ASRs providing Constrained Recognition and/or Structured Transcription.

Individual Users 22 having distinct legacy User protocols communicate with the Speech Recognition and Transcription System 20 via a communications link 24. Any User 22 who is authorized can request transcription of spoken text or other stored and generated System information; and, any User 22 may be the Recipient of transcribed spoken text and such other stored and generated System information. As described in detail below, the Speech Recognition and Transcription System 20 includes a System Transaction Manager, which transfers Meta Data and Speech (spoken text and Commands) among Users 22, and one or more ASRs which may exist on a centralized specific server application such as a Speech Recognition and Transcription Server (SRTS); or, one of the facilities (Peer Node) in a peer-to-peer network; or, networking as a distributed application architecture that partitions functionality, tasks, or workloads between peers to form a peer-to-peer network of nodes, as well as the "cloud" computing network configuration. In one aspect, ASPs provide access to a particular application program using a standard protocol such as HTTP.

The System Transaction Manager, as a central element of the System, may comprise more than one physical and/or functional elements and a multi-tiered System Transaction Manager may be practical in some applications. In one embodiment, the System Transaction Manager communicates with at least one User (Application) Service Adapter (ASA) (see FIG. 3), which provides an interface between the System Transaction Manager and a protocol that a User 22 employs to generate spoken text and Commands. The System 20 may also include one or more User Service Adapters 80 (see FIG. 3) that process formatting of information including Formatted Transcription and Routing 114 of information between the Application Service Adapters 80 and the System Transaction Manager 30' (bi-directional). This bi-directional communication facilitates, for example, System Transaction Manager's initiation of User interface prompts for Directed Dictation.

Communication links 24 include communication interface between the Users 22 and the System 20, which can be, for example, a public communications system, such as the Internet. Each User 22 has a User Identification (ID) for authentication and identification purposes, including identifying a Subscriber as fully explained below. According to one aspect, at least one User in any SIR transaction (Job) must be a Subscriber to the System. Thus, the Subscriber is an authorizing agent that permits the SIR transaction (Job) access to the System 20.

Speech to be transcribed, containing spoken text and Audio and Non-Audio Commands, when generated as Free Form Dictation and captured by a suitable User Interface Device using the legacy User protocol (Native Communications protocol and Native Communications protocol), is communicated to the System Transaction Manager in a manner as set out in more detail below. In one embodiment, the Speech can be generated by the User employing Directed Dictation which increases not only the Response time of the System, but the accuracy and usefulness of the Response as set out below.

As part of at least one User Interface Device, the Speech is input into the System using any well-known methods and devices for capturing audio signals. For example, spoken text can be acquired using a microphone coupled to an A/D converter, which converts an analog audio signal representing the spoken text and Commands (Audio and Non-Audio) to a digital signal that is subsequently processed using, for example, a dedicated digital signal processor or a general-purpose microprocessor. For a discussion of the acquisition of audio signals for Speech recognition, transcriptions, and editing, see U.S. Pat. No. 5,960,447 to Holt et al., which is herein incorporated by reference in its entirety and for all purposes.

The skilled artisan will realize that many audio input sources can be used by the User in accordance with the instant System. These inputs are capable of processing aspects involving population of User Profiles (both System and ASR), Enrollment, User and System Command Databases in addition to providing means of recording Speech and processing document retrieval, including a Response. These include applications that provide the minimum capability of recording Speech and streaming audio to the System Transaction Manager; telephony using a telephone line (including wireless) that provides audio and drop down menus that allow a User to navigate through choices such as those that allow a User to enter its ID, record Speech, review and edit the Speech, submit the audio recording to the System Transaction Manager, and update the User Profile; and recorders, including hand-held which are capable of recording Speech and of transferring the recording to a computer directly, as well as with the use of an A/D converter.

Figure 2:
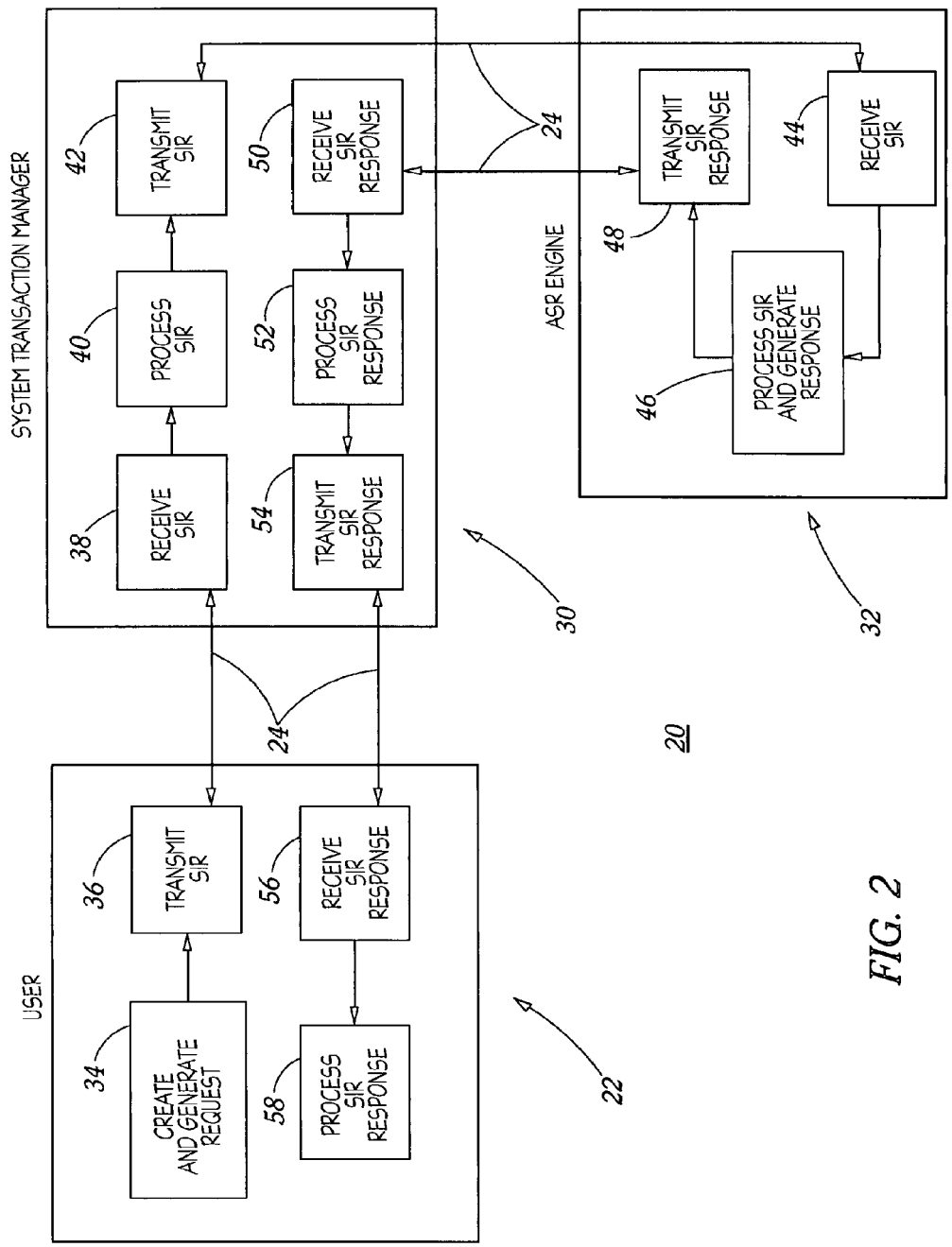
FIG. 2 is a schematic drawing showing processing and flow of information among Users and components of the System shown in FIG. 1.

As better seen in FIG. 2, the System 20 involves interface between a User 22 and the System Transaction Manager 30, as well as an interface between System Transaction Manager 30 and ASR 32 (or multiple ASRs). The User 22 System Transaction Manager 30 interface 24 is a bi-directional link which allows User 22 direct communication (through an ASA interface) with System Transaction Manager 30 which is instrumental in facilitating Free Form Dictation and, more importantly, Directed Dictation. Communication link 24 provides Real Time interaction and interface between System Transaction Manager 30 and User 22 such that System Transaction Manager 30 can interact with the User 22 Interface Device during Free Form Dictation. In this manner, System Transaction Manager 30 has "hands on" involvement in the structure and generation of the content of the SIR during actual dictation of Speech.

Likewise, the bi-directional communication link 24 between the System Transaction Manager 30 and the ASR(s) 32 provides dynamic interface 24 between the System Transaction Manager 30 and one or more ASRs 32 during recognition/transcription of the SIR to afford System 20 higher capability of series and/or parallel utilization of ASRs 32 having different input requirements and/or recognition/transcription capabilities.

In one embodiment, an Applicant, in order to become a User of the ASP System, initially must subscribe to the service receiving a User ID, account codes, billing instructions, and the like through legacy User protocol. Once the interaction between User 22 and System Transaction Manager 30 is established, the User 22 populates a User Profile which is used for a myriad of purposes within the System and may, for example, contain ASR Enrollment data, if required, pronunciation dictionary population, User Command Database population and the like. This initial transaction is accomplished through a special SIR to facilitate the interface and is not to be transcribed, even if populated by using vocal (microphone or line) input.

As part of this initial transaction, various User Interface Devices are also registered so that during Directed Dictation, the System Transaction Manager can efficiently, for example, use bi-directional prompts directed to a specific User interface when the User interface logs on to the System.

In operation, to produce a System transcription of the User generated Speech, which comprises spoken text and Commands, including Audio and Non-Audio Commands, using a User's 22 existing (legacy) protocol a SIR is created. Through a first User Service Adapter, the System Transaction Manager transfers the SIR to an appropriate ASR through an ASR ASA, if necessary. The ASR generates a Response to the Speech Information Request (SIR), which includes a Formatted Transcription of the spoken text. Using the SRSA, the Response is transferred to the System Transaction Manager. Through a second User Service Adapter, which may be the same or different than the first, the System Transaction Manager transfers the Response to one or more of the Users 22 with a transcription that is compatible with its particular (legacy) protocol. The Requesting User 22 and the Receiving User 22 may be the same User or a different User or a number of Users may receive the Response. Likewise, the SIR may be for Speech previously transcribed and stored in a Database. The System Transaction Manager employs a uniform or "system" protocol capable of processing SIRs and Responses expressed in a standard or normalized data format. The only requisite for this protocol is that it is convertible (by an ASA) into the legacy User protocol and/or any System Speech Recognition and Transcription Engines (ASRs) protocol.

As set forth above, the User and/or Application Service Adapters are the same when the User 22 requesting a transcription of spoken text also receives the transcribed spoken text, provided the application recording the Speech is the same as the application receiving the transcribed spoken text. In many cases, a User Application Service Adapter will reside on the User's 22 workstation/workgroup legacy computer system. In such cases, the System 20 can employ sets of different User Application Service Adapters (ASAs) and User Service Adapters to facilitate transfer of information between two Users 22, even though they may use similar protocols.

Turning to FIG. 2, there is shown a simplified block diagram containing processing and flow of information among Users 22 and components of the System 20 of FIG. 1. For clarity, the System 20 shown in FIG. 2 includes a representative User 22, System Transaction Manager 30, Speech Recognition and Transcription Engine 32, and communications links 24. It should be understood, however, that the System 20 would ordinarily include multiple Users, multiple SARs, and communications links, and would in certain embodiments include more than one System Transaction Manger, i.e. a tiered/server/clustered system with System Transaction Mangers communicating among themselves in a tiered/server/clustered arrangement. The System 20 includes numerous other System components, applications, and Databases. Users 22 normally access the System Transaction Manager 30 by sending a SIR which can include a request for stored Speech information that includes the User's 22 identification (ID) which can also be a Subscriber's ID if the User is a Subscriber. Each transaction must include a Subscriber, whether the Subscriber actually requests or receives information relating to that transaction or not. An authenticated SIR is processed by opening a Job by the System Transaction Manager 30 as further described.

As shown in FIG. 2, the System 20 includes processes that enable a User 22 to generate a dynamic streamed SIR 34 and transmit 36 the SIR to the System Transaction Manager 30. The System Transaction Manager 30 receives 38 the SIR, processes 40 the SIR, and transmits 42 the SIR to the appropriate Speech Recognition and Transcription Engine 32. The ASR 32 includes processes for receiving 44 the SIR, for processing and generating a Response 46 to the SIR (e.g., for transcribing the Speech), and for transmitting 48 the Response (e.g., transcribed Speech) back to the System Transaction Manager 30. The System Transaction Manager 30 receives 50 the Response, processes 52 the Response, and transmits 54 the Response to the User 22, which, may access System 20 processes that enable it to receive 56 the Response and to process 58 the Response to the SIR. This is all facilitated by use of authentication routines, certain protocol adapters, and User Profiles, as will be further explained.

User Input to the System (Free Form Dictation)

User inputs Speech and other information into the System via a User Interface Device. The majority of this input is accomplished through Free Form Dictation, including population of Databases and the like. The System, by means of the Transaction Manager, has bi-directional communication with the User through the User Interface Device. In this manner, applications can run on the User Interface Device using legacy User protocol in order to provide dictation prompts to the User which are managed and maintained primarily within the legacy User protocol, for example, on a server or workstation. These prompts are intended as a human machine interface, wherein the User is prompted to direct, constrain and otherwise structure the subject matter and content of the dictation.

Contrawise, using the bi-directional communication (through the ASA), the System is able to populate the User Interface Device prompts with data retained, stored, or retrieved by the System Transaction Manager in response to a Command. For example, when a User logs on using a User Interface Device, an automatic handshake is established with the System Transaction Manager; and, the System Transaction Manager is instructed as to all of the retained aspects and requirements associated with that particular User Interface Device.

The User, by combining prompts generated by legacy User protocol and the System Transaction Manager, in response to either sent or stored Commands, can use Free Form Dictation to enter Speech into the System via the User Interface Device.

Free Form Dictation is a concept and functionality that is viewed from the point of view of the User. The User, by using the system of prompts and/or guides described above, can interact with the User Interface Device to create a stream of dictated Speech in a conversational manner to convey or impart a thought, idea or concept to the listener or reader uninterrupted by pauses required for the system behind the User interface to access and carry out the functional instructions in a manner so that the speaker is virtually unaware of the workings and requirements of the System.

In addition, the System Transaction Manager, in order to process this Free Form Dictation and, more specifically, Directed Dictation, must itself possess a set of capabilities and operate in a rather unique fashion with internal System components, as well as the number of general and specialized ASRs able of interface with System Transaction Manager on the network. This is especially true when an ASP is able of seamless interface with Users using diverse legacy User protocols.

This interface between System Transaction Manager and one or more ASR enables the System to produce Constrained Recognition and/or Structured Transcription solely using the spoken text and Commands of the SIR produced using Directed Dictation.

Audio and Non-Audio Commands

As stated above, the Speech input to the System is accomplished by a User/System interface (User Interface Device). The ability of the System to recognize and transcribe Free Form Dictation depends upon two aspects of User/System interface. The first is the interaction of the User with the User Interface Device; and, the second is the dynamic interaction of the User Interface Device with the System Transaction Manager through an ASA by means of bi-directional communication. The first is accomplished by the User purposefully constraining the subject matter of the dictation as prompted by the legacy User protocol which is either statically hard-wired or exists on an application running on the legacy User protocol. Thus, in response to particular legacy User protocol prompts displayed on or communicated to the User by means of the User Interface Device, the User can constrain the dictation in accordance with the prompts. The second involves interaction (bi-directional) between the System Transaction Manager and the User Interface Device, whereby the System Transaction Manager, in response to, for example, the logon of a particular User Interface Device populated the User Interface Device by use of stored and/or acquired System User information. Likewise, the User, by specific interaction through the User Interface Device, is able to request from the System a specific prompt population, display, grid, or the like, which can be produced by way of the User Interface Device.

The above functionality is accomplished at least in the bi-directional communication by Commands, which are carried in the Speech audio stream and/or are pre-programmed into User's interface and/or System files, e.g. User's Database containing User Profiles, or the like. As set forth above, Audio Commands (Spoken or Tactile) generate an audio signal distinguishable by the User interface and/or the System Transaction Manager and/or the ASR from spoken text which are carried in the audio stream. Non-Audio Commands are inserted into the audio stream but are not part of the Audio Data and can comprise encoded or interleaved data, including Meta Data. The non-Audio Data is stored in segments.

In addition, the Free Form Dictation Speech contains various Commands which instruct the System Transaction Manager to institute a pre-programmed set of actions directed at System components and not the User Interface Device. These actions may involve inclusion of User Databases, Universal Database, specific ASRs, and/or vocabulary and/or dictionaries, and the like, selection of templates to facilitate the System's processing of the Directed Dictation Speech. In this manner, the streamed SIR created by Directed Dictation contains Commands embedded therein which the System Transaction Manager reads and carries out "on the fly" to yield Constrained Recognition and/or Structured Transcription, including Formatted Transcription.

In operation, the User's response to the prompts on the User Interface Device, as well as the Speech generated in response to these prompts, provide Commands such that the System Transaction Manager can configure the System to provide Constrained Recognition and/or Structured Transcription of the spoken text. This eliminates superfluous spoken text normally associated with non-constrained or Free Form Dictation and increases the efficiency of the System in processing the SIR containing Directed Dictation to provide a better transcribed work product which can also be formatted (Formatted Transcription).

For example, when a cursor on the User Interface Device is placed in a specific location on, for example, a form, this action embeds a Command for the System to use a specific vocabulary (Constrained Recognition). Further, a 2-dimentional schematic diagram of an aircraft engine displayed on the User Interface Device can generate Tactile Commands by the User touching a location on the schematic diagram to generate specific templates and/or vocabulary for the System. 3-dimentional models, such as the human anatomy, can also be used to constrain and direct dictation. For example, sensors can be placed on portions of the 3-dimentional models that generate Commands when activated which specify, for example, specific ASRs and/or vocabulary. Thus, activating the sensors in the heart area of 3-dimentional model designates cardiac references for the System, while activating sensors in the foot area designates, for example, podiatrist's vocabulary to the System. In this manner, input is directed such that the User keying on the particular prompt can dictate Directed Dictation aimed at a diagnosis, a treatment, insurance record, or the like. In this manner, the structure of the dictation actually activates the System, as well as provides structure for the dictation (Directed Dictation.)

This embodiment provides even greater functionality for the System in that Embedded Commands can include instructions to the System Transaction Manager contained in the Speech stream of the SIR which allows the System Transaction Manager to segment the streamed Speech and process the Job either in series or in parallel through various ASRs, vocabularies, dictionaries, and the like. For example, an application on the User Interface Device which transmits a Command transmitted to the System upon the User Interface Device logon identifies the User Interface Device and allows the System to obtain the requisite profile and Enrollment data associated with that device for insertion into the SIR.

Directed Dictation uses Commands to not only structure the input (SIR), but also the output (Response) of the System. For example, an Audio Command inserted by the legacy User protocol into the Speech after a User selects a new form field on the User Interface Device directs the System Transaction Manager to queue a particular ASR and/or vocabulary (Constrained Recognition) and/or particular processing of transcribed spoken text (Structured Transcription) and/or placing the transcribed spoken text into a particular format (Formatted Transcription). This is particularly useful for dictation using a touch tone phone, where each number key can be assigned a function.

Thus, the System is instructed to perform certain tasks or access certain functionalities upon reading a Command. The exact System component for carrying out the Command is contained within the Command. A Command can be carried out by the legacy User protocol and/or the System Transaction Manager and/or the ASR according to the instructions associated with a specific Command. A Command is associated with one instruction, so as not to introduce ambiguity. Commands can also be defined for "User groups" and as a universal default that could be overridden by the User for specific applications. In one embodiment, a Command is associated with an indexed Database. A lookup is made into the set of Commands in the updated Commands Database for a match. Once a match is found, the instruction associated with the Command is processed.

As can be seen, use of Directed Dictation reduces the "garbage in—garbage out" problems associated with pure Free Form Dictation. Additionally, Constrained Recognition enhances the recognition accuracy by matching the dictated words to the optimum ASR, as well as vocabularies for that ASR resulting enhanced recognition accuracy.

Another advantage of Directed Dictation is that it provides heretofore not available System flexibility and autonomy in processing dictated Speech. Based on System's rules, either within the System or existing in the legacy User protocol, the System Transaction Manager can parse, rout, and instruct System components regarding a complete Job. For example, selecting and processing the dictation using the most appropriate ASR for the subject matter being dictated; selecting and processing the dictation with Constrained Recognition using a specialty vocabulary as directed by the User or the User Interface Device prompts proper processing of the Structured Transcription of the transcribed text and/or formatting the transcribed text to produce a Formatted Transcription.

In another embodiment, the System can be configured such that all Speech is recognized within a Dictation Context. In accordance with this aspect, Directed Dictation and/or Constrained Recognition and/or Structured Transcription can be preset in Response to a specific set of Commands which are usually Non-Audio. The Dictation Context includes elements from the legacy User protocol, the User Interface Device, User Profile associated with the recognition of the spoken text, including vocabulary, User Enrollment, spoken language, preferred Automated Speech Recognition and/or Transcription Engine (ASR), Correctionist, Correctionist Pool, and the like. In this manner, a preset set of conditions for recognition and transcription of spoken text can be instantly programmed into the System. This is particularly useful when forms or other repetitive documents must be populated by Speech dictation. This allows a User to engage in Directed Dictation (Free Form) for otherwise tedious transcription task.

It will be realized by the skilled artisan that a number of Commands can be used to narrowly direct dictation and yield a cleaner transcription product by use of these various input schemes.

System Input to the ASR

As previously stated, the System, using the System Transaction Manager allows the operation of the system behind the User Interface Device to operate efficiently and process SIRs effectively to increase accuracy and utility of the transcribed Response. This System operation is in many respects separate and apart from the User interface and for the most part it is carried on without knowledge or interaction with the User. This is especially true for SIRs not requiring Real Time transcription processing.

ASRs have varying characteristics and requirements for their effective utilization. For example, some ASRs will not accept other than microphone or line input. Others do not operate upon streamed Speech and require batching of the dictated Speech files. Further, in order to effectively utilize all of the capability of the System, the System Transaction Manager must be able to switch ASRs "on the fly" in response to Commands embedded in the streamed Speech as, for example, when the User is prompted to change the subject matter and/or processing of the Speech by the User Interface Device. Further, in order to process many prioritized Jobs (SIRs), the System Transaction Manager needs to be able to process large Jobs though a number of ASRs in parallel, while retaining the exact location and progress of each of the segments parsed to a number of ASRs simultaneously (in parallel).

When a single Job requires multiple ASRs in series, the System Transaction Manager must have a way of "marking" the Speech stream and buffering the continuous stream, while the set up and communication with a new ASR having, for example, new vocabulary, is established.

Virtual Sound Driver

In order to take advantage of particular and specific capabilities of various ASRs, the System must interface with these engines in a dynamic manner which requires the change of use of a particular ASR and/or a particular vocabulary "on the fly." In one embodiment, the System employs a Virtual Sound Driver for streaming Free Form Dictation from the System Transaction Manger to any ASR, regardless of the ASR's inability to recognize and/or transcribe spoken text other than from, for example, a live microphone or line, as well as batched audio files. In this embodiment, the System Transaction Manager sends spoken text and Commands to the ASR by way of the Virtual Sound Driver. The Virtual Sound Driver outputs the spoken text (digitized) in a data format which simulates or mimics that of the input from any input source such as, for example, a live microphone or line source. This results in the ASR, upon receiving the spoken text from the Virtual Sound Driver, processing it as if it were generated by any input source such as, for example, a live microphone or line source, regardless of the actual originating source.

The Virtual Sound Driver can accept input audio data, for example, by streaming or reading from an audio file, thus allowing any engine to process stored audio data, even when the recognition engine's API does not directly support processing an audio file. Thus, the Virtual Sound Driver advantageously can accept input audio data by receiving data from a live network connection using any protocol, thereby allowing streaming of audio data directly without having to first store the data or from stored data. In this manner, the audio data can be transcribed in Real Time or near Real Time as the speaker is dictating.

Constrained Recognition

In another embodiment, the ASR is commanded to configure such that it will accept constraints on recognition and/or structures on transcriptions for information that is limited to a specific prompt on the User Interface Device. In accordance with this embodiment, a dynamic vocabulary/ dictionary stored in the ASR Database is indexed to recognize the prompt. Thus, when the User or the System activates the particular prompt on the User Interface Device, the ASR recognizes the constraints and/or structure required, as well as the vocabulary in the SIR transferred to the ASR by the System Transaction Manager. The prompt can be activated by the User or the System using any means heretofore disclosed, including, for example, eye movement into a grid or tone from a telephony device. Thus, in accordance with this embodiment, the ASR is able to provide dynamic Constrained Recognition and/or Structured Transcription for Users of the System who employ the particular prompt.

Buffer Function

The Buffer (Buffer function) of the instant System can be any of the devices or applications known in the art for storing and holding information on a temporary basis. The Buffer device or function is able of dynamically accumulating and/or storing streamed data submitted by the User or the ASR in either Real Time or from storage to allow the System Transaction Manager to perform System's functions seamlessly without loss of streamed User information and/or to allow ASR to perform Constrained Recognition and/or Structured Transcription functions seamlessly without loss of streamed Real Time or near Real Time SIR User information, while the online User perceives no disruption in Free Form Dictation.

The Buffer is activated by the System Transaction Manager's response to a Command either in a Database or embedded in the audio file. Upon activation, the System Transaction Manager identifies the beginning of the storage such that the stored portion is seamlessly placed back into the SIR. In another embodiment, the Buffer is used to retain Speech, including that produced by Free Form Dictation for ASRs that are incapable of accepting continuous streamed Audio Data, i.e. they are batch processors. This embodiment is extremely useful for processing long User sessions, such as, for example, in a court room.

The SRSA and the ASA

The User ASA provides a bi-directional translation service between the User's Native Communications Protocols/ Native Application Protocols and a uniform System protocol used by the System Transaction Manager. Examples of the ASA include recording Audio Data, inserting recognized text into the application document editor, providing a User interface for editing the User Profiles, transmitting the streamed Audio Data to the System Transaction Manager, receiving the transcription document or recognition result, User processing of Embedded Commands in the Response generated by the System Transaction Manager, inserting Embedded Commands in the User system in support of Directed Dictation, and the like.

To accommodate yet another System protocol used by the ASR, a Speech Recognition Service Adapter (SRSA) communicates with the System Transaction Manager and the ASR to provide a designated engine with a SIR, which is compatible with the engines and a Response compatible with the System Transaction Manager's protocol. This SRSA processes formatting the transcribed spoken text received from the System Transaction Manager for ASR interface, as well as the Response received from an ASR into or from a System protocol or a legacy User protocol used by the User and/or the System Transaction Manager. Formatting includes such items as converting raw text to RTF, HTML, and the like interpreting and applying Commands, populating any specified forms or templates and/or protocol conversion. SRSA also can be used to produce Formatted Transcription directly from the ASR.

Databases

The Databases used by the System, without limitation, comprise four general types, each of which is an indexed information repository able of access by the System Transaction Manager and/or other System components in response to specific Commands which can be User generated or System generated and can include previously transcribed Free Form Dictation and/or Directed Dictation.

The ASR Database, which is associated with the ASR through, for example, the SRSA, contains information, including User Profile, Enrollment, vocabularies/dictionaries and the like required by the ASR to process a SIR or Real Time SIR.

System Database operated upon by the System Transaction Manager contains general System responses to Commands, including User Profiles. A System Database maintained by the System and interfaced by the System Transaction Manager allows information to be obtained by the System to perform System oriented housekeeping, administrative, and various other System related tasks.

The Universal Database, which can include, for example, language dictionaries, phraseology and/or vocabulary, which are generic to specific professions such as, for example, medical or law, is available for use by all Users and/or all System components, including the System Transaction Manager. This Database can contain a set of specific forms, templates, or the like to facilitate Free Form Dictation. In one embodiment, the Universal Database is associated with Constrained Recognition and/or Structured Transcription. In this embodiment, specific dictionary or vocabulary associated with Directed Dictation is retained, as well as generic or specific prompts, templates, and the like to facilitate Directed Dictation which is available for all Users, or a specific group of Users of the System. The Universal Database can be populated with System Commands to implement a number of coordinated actions within the ASR. Universal databases are populated generally in coordination with the System administration or upon request of a User or group of Users.

User Databases, which are unique to a specific User, include the User Profile and can include User specific pre-programmed System responses to Commands for facilitating Directed Dictation. The User Database is located on the legacy User System and/or the System Transaction Manager, but is available system-wide to all System components which need access to User specific information. The User Database can also contain specific template, instructions and prompts for use with Directed Dictation.

These formats may include specific templates which direct the User Free Form Dictation Speech to specific formats for Directed Dictation and/or Structured Recognition instructing the System Transaction Manager to access particular ASRs and/or specific dictionary and/or vocabulary.

Correctionist and Correctionist Pool

Using its preferred application, the Correctionist operates within the workflow of the System such that after a Job is processed for transcription, it remains in a Correctionist Pool queue maintained by the System Transaction Manager awaiting processing by a Correctionist. Following correction, the Job is returned to the System Transaction Manager for transfer to a Requesting User or the Recipient User or any number of other specified Users. Other than having special permissions, the Correctionist interacts with the System in the same manner as a User. Correctionist permissions are granted on the basis of Correctionist Pools. A Correctionist Pool maintains its own Job queue and is administered by a pool manager. The programming applications restrict which Jobs are accepted for processing by the Correctionist Pool. The Correctionist Pool manager adds or deletes Correctionists based upon the programming applications. Depending on how the Correctionist Pool is configured, the Correctionist Pool manager may be involved in every Job processed by the Correctionists.

Generation of the Speech Information Request (SIR)

Turning again to the figures, the User 22 as shown in FIG. 2, generates 34 a Speech Information Request (SIR), which includes spoken text and Commands and may be a Real Time SIR. Alternatively, the SIR can comprise a request for previously transcribed and stored information. As noted earlier, the System 20 preferably utilizes a Normalized Data Format, which can be used as the System protocol by the System Transaction Manager 30. The Speech Information Request (SIR) includes an informational header and a formatted message portion (Meta Data). The header, the Meta Data, or both the header and the Meta Data may contain system Routing information, which includes, for example, the Requesting User's 22 identification and meta addresses of a Recipient User 22, or of a particular ASR 32. The System Transaction Manager 30 uses the identification information to ensure that the User 22 is authorized to use the System 20 and, preferably, simultaneously verifies that a Subscriber has authorized the transaction.

Generation of the SIR 34 is by Free Form Dictation which is produced using legacy User protocol. Alternatively, the SIR can be stored on a System Database. The generation is a language-independent configurable set of services written in a high-level language such as C, C++, Java, and the like, which allows a User 22 to "plug" its existing application software and hardware into the System 20 to generate 34 the SIR. A User 22 can generate 34 the SIR in Real Time or offline for later submission as a batch Job. Likewise, the User 22 may employ a User Interface Device such as mobile wireless phone, which provides, for example, a wireless connection to the System 20 through the ASA.

Transmission of the Request to the System Transaction Manager

The User 22 transmits 36 the SIR to the System Transaction Manager 30. An Updated User Profile can accompany the SIR, which the ASR 32 and other components of the System 20 can use to increase the efficiency of the transaction (Job), as well as the accuracy of the Speech recognition/transcription. As stated previously, the content of the User Profile is specific to a User and more specific to an individual speaker who may be enrolled in a specific ASR; although most ASRs no longer require Enrollment. The User Profile requirements can vary among ASRs 32, but typically includes information derived from corrections of past Speech recognition and transcription sessions.

It will be realized that the User Profile can also be maintained on the User Database and retrieved by the System Transaction Manager 30 or ASR 32. The legacy User Interface Device (or User work group) may contain a User Profile and/or an Updated User Profile.

The System 20 transmits 36 the SIR to the System Transaction Manager 30 via the communications link 24. The System 20 may use any type of communication system, including a pre-existing public Communication System such as the Internet, to connect the Requesting User 22 with the System Transaction Manager 30. For example, the Application Service Adapter (ASA) 80 (see FIG. 3) is able of generating the SIR in the System 20 (Normalized Data Format) using, for example, Extensible Markup Language (XML), which is transmitted 36 to the System Transaction Manager via Hypertext Transfer Protocol (HTTP), Transmission Control Protocol/Internet Protocol (TCP/IP), File Transfer Protocol (FTP), and the like. Other useful data transmission protocols include Network Basic Input-Output System protocol (NetBIOS), NetBIOS Extended User Interface Protocol (NetBEUI), Internet Packet Exchange/Sequenced Packet Exchange protocol (IPX/SPX), and Asynchronous Transfer Mode protocol (ATM). The choice of transportation protocol is based on cost, response times, and the like.

Receipt of the SIR by the System Transaction Manager

As further seen in FIG. 2, the System Transaction Manager 30 receives 38 the SIR from the Requesting User 22 via the communications link 24. Receipt 38 of the SIR activates the System Transaction Manager 30 to create a Job. For example, if the SIR is not in the appropriate format, the System Transaction Manager 30 translates the SIR into the System format, for example, Normalized Data Format, thus acting as an ASA for the Requesting User 22. The System Transaction Manager 30 can decrypt SIRs based on a decryption key previously supplied by the User 22. The System Transaction Manager 30 also logs the receipt of the SIR, and sends a message to the User 22 via the communications link 24 confirming receipt of the SIR. In addition, the System Transaction Manager 30 authenticates the User 22 ID, verifies a Subscriber authorization, and assigns a Job ID to be used internally within the System to identify, track, and report on the Job as it is processed through the System.

To simplify this validation and to facilitate subsequent processing 40 of the SIR, the System Transaction Manager 30 creates a data record by stripping off the informational header (Meta Data) and by extracting Speech data (digitized audio) and Commands from the SIR. The resulting data record can be complete for processing or can command the System Transaction Manager 30 to populate the data file from one or more indexed files or entries in a Database. The total compilation of all the information needed to process the SIR comprises a Job with a Job ID, ready for processing. A Job may also refer to a specific Constrained Recognition and/or Structured Transcription, including Formatted Transcription requirements to process the Job. SIRs containing Speech from Directed Dictation require more specific processing by the System Transaction Manager.

During validation of the SIR, the System Transaction Manager 30 examines the data record to ensure that the SIR meets certain criteria. Such criteria may include compatibility among interfaces which permit information exchange between the User 22 and the System Transaction Manager 30. Other criteria may include the availability of a User Profile. Through the Virtual Sound Driver, the System Transaction Manager may select any ASR compatible with the spoken text of the SIR. Since the System employing the Virtual Sound Driver is compatible with the input requirements of all ASRs, the System Transaction Manager need not test for compatibility. Additional criteria may include those associated with the authentication of the User 22, such as the User's 22 status, whether the User 22 has the requisite permissions to access System 20 services, and so on.

If System Transaction Manager 30 is unable to validate the SIR, it logs the error and stores the data record of the SIR in the System Database. Additionally, the System Transaction Manager 30 returns the SIR to the User 22, and informs the Requesting User 22 of the validation criteria or criterion that the Requesting User 22 failed to meet.

Processing of the Request by the System Transaction Manager

Following receipt 38 of the SIR, the System Transaction Manager 30 processes 40 the validated SIR (Job) prior to transmitting 42 the spoken text and Commands from the SIR to the ASR 32. As part of the processing 40 function, the System Transaction Manager 30 stores the SIR as an entry in an appropriate Job bin or bins for queued processing according to the System priority. The Job priority may be based in part on processing restrictions imposed by the Speech (e.g., subject matter of spoken text, Command structure, and the like), which limits the set of ASRs 32 that are capable of processing the Speech.

Bins are further subdivided based on priority level. The System Transaction Manager 30 assigns each Job a priority level that depends on a set of administrative rules imposed by the System 20. An individual SIR therefore resides in a Job bin until an ASR 32 requests the "next job." Because of the capabilities and flexibility of the System 20, the System Transaction Manager 30 can process Jobs through ASRs in series, i.e. segments, or in parallel, i.e. numerous ASRs operating on segments of a single Job, utilizing the Buffer function, the System Transaction Manager 30, upon detecting a Command in the audio file to switch vocabulary (needed for Directed Dictation) and/or ASRs, can spool and/or rewind the streamed spoken text such that there is no apparent interruption in processing from a User 22 viewpoint. In addition, because the System 20 has ability to process Free Form Dictation which inherently involves additional Commands in the Speech, the System Transaction Manager 30 is more closely involved in the processing of the SIR, including segmenting a particular Job to a number of ASRs, i.e. parallel, while keeping track of the segments.

In this respect, System Transaction Manager 30 uses an Audio Preprocessor to read Audio and Non-Audio Commands in the streamed Speech breaking the spoken text into segments, such that the segments are able of separate and distinct processing by the System. This is important in processing Free Form Dictation and more specifically, Directed Dictation.

The System Transaction Manager 30 releases the next Job having the highest priority from a Job bin which contains SIRs that can be processed by the available ASR 32. Real Time SIRs operate at the highest priority to allow for Real Time or near Real Time transcription of Speech. In the Real Time SIR situation, the System Transaction Manager 30 immediately locates one or more available ASRs 32 capable of processing the SIR and establishes a bi-directional direct bridge such that spoken and transcribed spoken text can be directly exchanged between the requesting User 22 and the ASRs for Real Time or near Real Time processing.

Processing 40 also includes preparing the SIR for transmission 42 to ASR 32 by parsing the information header (Meta Data). The System Transaction Manager 30 may also execute operations or Commands embedded in the SIR by implementation during processing 40.

Transmission of the SIR from the System Transaction Manager to the Speech Recognition and Transcription Engine Once the SIR has been processed 40, the System Transaction Manager 30 transmits 42 the spoken text and Commands related to ASR operation to be read by the ASR to the selected ASR via the communications link 24. The System Transaction Manager prepares the SIR for transmission to the appropriate ASR 32. Following preparation of the SIR, the System Transaction Manager 30 transmits 42 the SIR to the ASR 32 via the communications link 24 and using an acceptable communication protocol, such as HTTP, TCP/IP, FTP, NetBIOS, NetBEUI, IPX/SPX, ATM, and the like. The choice of transportation protocol is based on cost, compatibility, response times, and the like.

Receipt of the SIR by the ASR

The System Transaction Manager 30 transmits 42 the SIR to the ASR 32, which has authority to access any information in any database needed to process the SIR. Further, Audio or Non-Audio Commands may be read by the ASR to specify transcription and/or formatting. This is especially true with Directed Dictation requiring Constrained Recognition and/or Structured Transcription. Additional information required to process the Job by the ASR may be accessed in various Databases by the ASR or such information can be retained in the ASR Database.

Receipt 44 of the SIR activates the ASR 32 (or Speech Recognition and Transcription Server (SRTS)) which logs and authenticates the receipt of the SIR to the System Transaction Manager. The ASR tests the System protocol to determine compatibility with the ASR protocol. If they are not compatible, then System 20 employs one or more Speech Application Service Adapters (see FIG. 3) to provide an interface between the System Transaction Manager 30 and the ASR 32.

During processing the SIR and generating the Response 46, the ASR 32 is able to access the ASR Database to obtain User directed files, such as User Profile, Command dictionary, Enrollment and the like. Alternatively, the ASR 32 may request from the System Transaction Manager 30 to access Universal and User Databases to obtain the information required.

Processing of the SIR and Generation of the Response by the ASR

Following receipt 44 of the SIR, the ASR 32 processes the SIR and generates a response 46. The Response comprises a transcription of the spoken text containing formatting which may refer to the internal representation of the transcribed Speech within the System 20 (i.e., its data structure) or to the external representation of the transcribed Speech (i.e., its visual appearance) or to both.

The ASR 32 transcribes the Speech and generates the Response. Like the SIR, the Response comprises the transcribed Speech and Commands related to post-processing and Meta Data. The ASR transmits 48 the Response to the System Transaction Manager 30 via the communications link 24.

Figure 3:
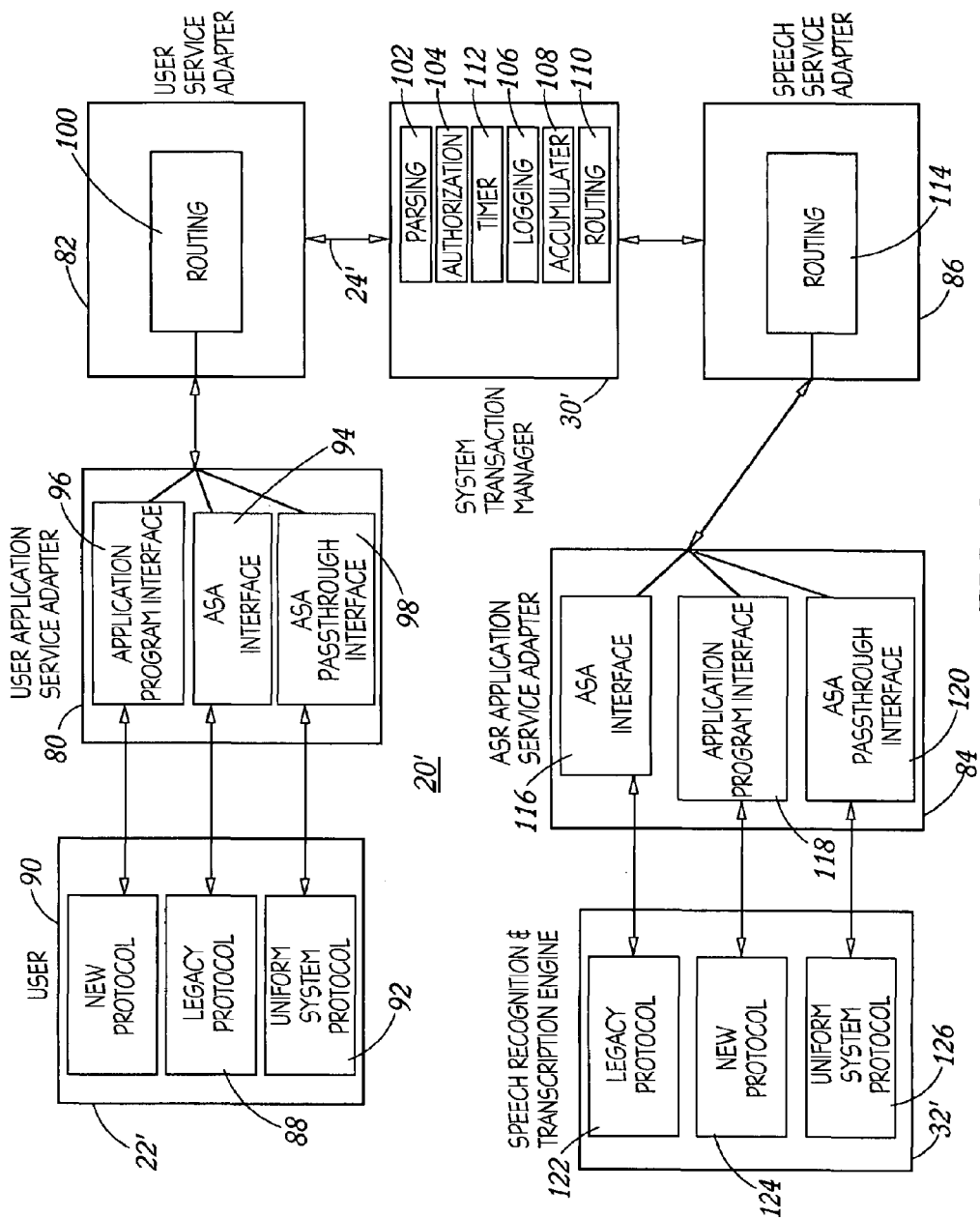
FIG. 3 is a schematic drawing of another embodiment of a System for facilitating Speech recognition and/or transcription.

As shown in FIG. 3, if the ASR 32 cannot write the Response in Normalized Data Format, an ASR Application Service Adapter 84 and/or a Speech Service Adapter 86 generates the Response from a transcription produced using the ASR 32 existing ASR protocol. Once the Response has been generated, it is queued for transmission to the System Transaction Manager 30.

Transmission of the Response from the ASR to the System Transaction Manager

As shown in FIG. 2, following processing the SIR and generating the response 46, the ASR 32 transmits 48 the Response to the System Transaction Manager 30 via the communications link 24 using an acceptable communication protocol, such as HTTP, TCP/IP, FTP, NetBIOS, NetBEUI, IPX/SPX, ATM, and the like. The choice of transportation protocol is based on cost, compatibility, response times, and the like.

Receipt and processing of the Response by the System Transaction Manager

The System Transaction Manager 30 logs its receipt 50 of the Response and sends an acknowledgment to the ASR 32 via the communications link 24. To prepare for transmission 54 of the Response to the Receiving User as designated in the original SIR, the System Transaction Manager 30 can perform other processing 52, including providing Formatted Transcription.

In addition, the System Transaction Manager 30 can place the Response or Job in a Correctionist Pool queue to await processing by a Correctionist. Following correction, the Job is returned to the System Transaction Manager 30 for transmission 54 to the Requesting User 22 or other Users.

Following correction or other processing 52, the System Transaction Manager 30 notifies the Requesting User 22 and/or other Receiving Users that a Response to the SIR is available. The System Transaction Manager 30 ordinarily notifies the Recipient or Receiving User 22 using electronic messaging via the Communications Link 24, but in general, may notify the User 22 by any technique specified by the Requesting User 22 or the Recipient or Receiving User. In any case, the Response remains as a record in a Database maintained by the System 20 until archived. The Response so maintained may be accessed by any authorized User at any time and comprises a separate Job.

Transmission of the Response to the Requesting User, Designated Recipients, or Both Following processing 52, the System Transaction Manager 30 transmits 54 the Response to the SIR to the Requesting User 22 and/or to any other Recipient Users as designated in the SIR. If necessary, the System Transaction Manager 30 appends the User 22 ID and any additional Routing information, and transmits 54 the Response via the communications link 24 using an appropriate protocol as described above.

Receipt of the Response by the Designated Recipient Users, Including the Requesting User The System Transaction Manager 30 transmits 54 the Response to the Recipient Users, which usually includes the Requesting User 22. If the Recipient User can accept a Response expressed in the Normalized Data Format or if the Response is expressed in a format that is compatible with the Recipient User legacy User protocol, then the Recipient User forwards the Response on for processing 58. As seen in FIG. 3, if the format of the Response is incompatible with the Recipient User's legacy User protocol, then the System 20 may employ an ASA 80 to provide an interface between the System Transaction Manager 30 and the Recipient User. Ordinarily, the Requesting User 22 and any non-requesting Users or passive Users 22 will employ ASAs that reside on their respective legacy User systems. Wherever the ASA resides, the Recipient User usually sends a message to the System Transaction Manager 30 via the communications link 24 acknowledging receipt 56 of the Response.

Processing of the Response by the Recipient Users, Including the Requesting User After receiving 56 a Response compatible with the Recipient User's legacy User protocol, the Requesting User 22 (or any Recipient) may process 58 the Response as necessary. Any processing 58 will depend on the particular needs of the Requesting User 22 or Recipient; and, therefore, may vary significantly among Recipients. Typical processing 58 includes error correction, formatting, broadcasting, computation, and so on.

Speech Recognition and Transcription System Utilizing Various Native Application Protocols FIG. 3, which has been briefly referred to previously, shows a simple block diagram of one advantageous embodiment of the System using both service adapters and routing adapters which System can comprise functionality of the User or the ASR and/or the System Transaction Manager. The System includes a User 22', which communicates, at least indirectly, with a System Transaction Manager 30' and an ASR 32'. Similar to the embodiment shown in FIG. 2, the System 20' could include multiple Users, including passive Users, Requesting Users, and/or Receiving Users and ASRs, and could include a plurality of System Transaction Managers.

As described in more detail below, the User 22' communicates with the System Transaction Manager 30' through a User Application Service Adapter 80 and a User Service Adapter 82. Similarly, the ASR 32' communicates with the System Transaction Manager 30' through an ASR Application Service Adapter 84 and a Speech Service Adapter 86.

The User 22' can initiate the transaction as a Requesting User, as shown in FIG. 3, and can utilize a legacy protocol 88, a new protocol 90, or a uniform System protocol 92, which is compatible with the Normalized Data Format utilized by the System Transaction Manager 30'. When using the legacy protocol 88, the User 22' communicates with an ASA interface 94 in much the same manner as the System 20 User 22 of FIG. 2. However, a User 22', employing the new protocol 90, communicates with an API 96, which, besides providing an interface between the User 22' and the System Transaction Manager 30', also allows the User 22' to access services that an operating system makes available to applications running under its control. The API 96 can provide services (e.g., automatic generation of insurance forms, engineering design templates, pleadings, and the like) geared to activities of a particular industry or group such as, for example, physicians, engineers, lawyers, and the like.

Like the System Transaction Manager 30', the uniform System protocol 92 processes information expressed in the Normalized Data Format. Therefore, an ASA interface 94, which links the uniform System protocol 92 with the User Service Adapter 82 and the System Transaction Manager 30', provides minimal translation services, and typically simply validates any SIR or Response.

As with the embodiment shown in FIG. 2, the System 20' depicted in FIG. 3 provides Speech recognition and transcription services using SIRs and Responses. To initiate transcription of Speech, a Requesting User 22' thus generates a SIR using the legacy protocol 88, or the new protocol 90, or the uniform System protocol 92. It will be realized that if the Requesting User 22' has the ability to generate a SIR in uniform System protocol, there is no need to access an ASA, as described below.

In addition to providing Speech for transcription, the SIR includes Meta Data, for example, addresses or specific addresses of the ASR 32, as well as Recipients of the Response and the like.

Once the Requesting User 22' creates the SIR using its legacy protocol 88, it transmits the SIR to the User ASA 80 for processing which transforms, if necessary, the SIR so that it adheres to the System Transaction Manager's uniform System protocol.

As shown in FIG. 3, following transformation of the SIR, the Application Service Adapter 80 forwards the SIR to the User Service Adapter 82. A Routing process 100 within the User Service Adapter 82 forwards the SIR to the System Transaction Manager 30' over a communications link 24' (e.g., TCP/IP link). The Routing process 100 within the User Service Adapter 82 does not operate on information in the header or data portions of the SIR destined for the System Transaction Manager 30'.

Once the System Transaction Manager 30' receives the SIR, a parsing process 102 obtains addresses provided in the Meta Data contained in the SIR, which allows the System Transaction Manager 30' to identify, among other things, the targeted ASR 32'. When the parsing process 102 obtains addresses of multiple ASRs and/or ASRs having different capabilities, for example, to process using Constrained Recognition and Structured Transcription, especially in response to SIRs created by Directed Dictation, the System Transaction Manager 30' distributes these SIRs and/or segments (as broken down by the Audio Preprocessor, not shown) for processing as described above. In this manner, the Job can proceed through the System either in parallel or in series, depending on particular requirements of the SIR. As set forth previously, the System, using the Virtual Sound Driver, provides the System Transaction Manager with the ability to use various ASRs irrespective of their system input requirements. Other information, such as the selected language, vocabulary, topic, and the like, when transmitted to an ASR, can require the ASR to process the SIR using Constrained Recognition and/or Structured Transcription as set forth above.

Following parsing of the addresses (Meta Data), the System Transaction Manager 30' forwards the SIRs to an authorization process 104. By comparing information in the SIR with entries in a lookup table, the authorization process 104 verifies the identities of the Requesting User 22' and other Recipients (if any), the identities of their protocols, and the identities of the ASR 32', as well as the Subscriber authorizing the transaction.

In conjunction with the authorization process 104, the System Transaction Manager 30' dispatches the SIR to a logging process 106, which logs each SIR. If the authorization process 104 determines that a SIR has failed authorization for any number of reasons (lack of access to the ASR 32', invalid Recipients, unauthorized Requestor, or the like), the logging process 106 notes the failure in the session control table and notifies an accumulator process 108. The accumulator process 108 keeps track of the original SIR and all duplicates of the original SIR. After the SIR is logged, it passes to a Routing process 110, which directs the SIR to the Speech Service Adapter 86, which is associated with the targeted ASR 32'.

When the original SIR designates multiple ASRs, the Routing process 110 directs the duplicate SIRs to the appropriate Speech Service Adapters 86 associated with the ASRs. The Routing process 110 examines the address of the addressee in the SIR and then either routes the SIR to the appropriate Speech Service Adapter(s) 84 using the ASR 32' address in the header, or places the SIR into a prioritized "first in-first out" (FIFO) queue where it waits for the required ASR.

A Routing process 114 within the Speech Service Adapter 86 directs the SIR to an appropriate interface 116, 118, 120 within the ASR Application Service Adapter 84. The choice of interface 116, 118, 120 depends on whether the ASR 32' utilizes a legacy protocol 122, a new protocol 124, or a uniform System protocol 126, respectively. As noted above with respect to the Requesting User's 22 protocols 88, 90, 92, the ASR 32', and the Speech Recognition and Transcription Server that supports the ASR 32', employs only one of the protocols 122, 124, 126. Similarly, the ASR Application Service Adapter 84 has only one interface 116, 118, 120, depending on the protocol 122, 124, 126 utilized by the ASR 32'.

Upon receipt of the SIR, the interface 116, 118 stores the Job ID and Meta Data, and translates the SIR into the Native Applications Protocol and Native Communications Protocol, if necessary. Once the ASR 32' transcribes SIRs expressed in the Normalized Data Format, the interface 120 validates the SIRs. In any event, the interface 116, 118, 120 forwards the translated or validated SIR to the ASR 32'.

After receiving the SIR, the ASR 32' generates a Response, which includes a transcription of spoken text and processing Commands, such as to obtain a Formatted Transcription, and transmits the Response to the System Transaction Manager 30' via the ASR Application Service Adapter 84 and the Speech Service Adapter 86. The ASR Application Service Adapter 84 forwards the Response (in Normalized Data Format) to the Speech Service Adapter. The Routing process 114 within the Speech Service Adapter 86 forwards the Response to the System Transaction Manager 30', again using a communications protocol compatible with the uniform System protocol.

Following receipt of the Response, the Routing process 110 within the System Transaction Manager 30' notifies the accumulator process 108 that a Response has been received. The accumulator process 108 checks the session control table to determine if all Responses have been received for the original SIR. If any Responses are outstanding, the accumulator process 108 goes into a waiting condition. This process continues until all Responses to the original SIR and any duplicate Requests have been received, have been timed out, or have been rejected because of an authorization 104 failure.

After the original SIR and all duplicate Requests have been processed, the accumulator process 108 emerges from its wait condition and creates a single Response to the original SIR by combining all of the Responses from the targeted ASRs. The accumulator process 108 dispatches an asynchronous message to the logging process 106, which logs the combined Response, and forwards the combined Response to the Routing process 110. The Routing process 110 reads the address of the Requesting User 22' and the addresses of any additional or alternative Recipients of the Response, and forwards the Response or Responses to the User Service Adapter 82 and, alternatively or optionally, to other appropriate Recipient User Service Adapters.

Focusing on the Requesting User 22', once the User Service Adapter 82 receives the Response, the Routing process 100 within the User Service Adapter 82 transmits the Response back to the User Application Service Adapter 80 with the appropriate interface 94, 96, 98. The Routing process 100 within the User Service Adapter 82 determines the appropriate interface 94, 96, 98 by examining the Response header or to whichever interface initiated the transaction. Continuing the earlier example, the ASA interface 94 reformats the Response, which is expressed in the Normalized Data Format, so that it is compatible with the legacy protocol 88 of the Requesting User 22'. As part of the translation process, the ASA interface embeds the Job ID into the Meta Data contained in the Response as is required by the legacy protocol 88.

Interface Between Users and System Transaction Manager

Figure 4:
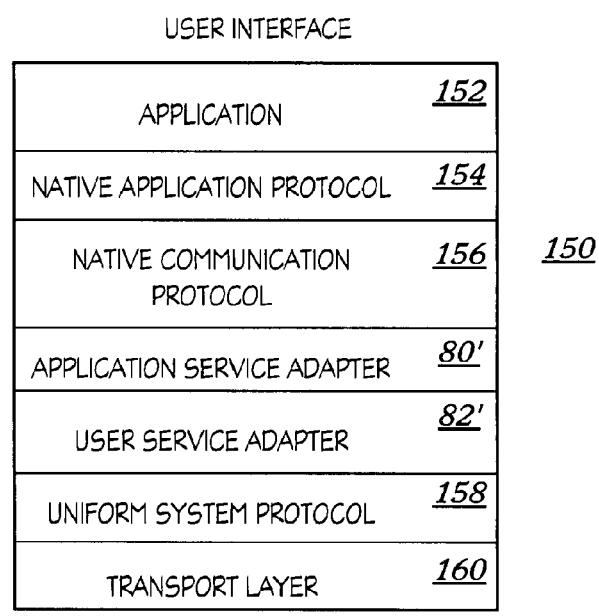
FIG. 4 is schematic drawing of a User interface.

Turning to FIG. 4, a typical User interface 150 is shown. This interface 150 permits bi-directional communication between the User 22' and the System Transaction Manager 30' as shown in FIG. 3. In FIG. 4, using an application 152, running on a microprocessor, the Requesting User 22' generates a SIR, as previously described. The application 152 conforms to a Native Application Protocol 154, which generates a SIR comprising dictated Speech which may be a Real Time or near Real Time SIR. As noted above in discussing FIG. 3, the User 22' also employs a Native Communications Protocol 156 to enable transmission of the SIR to an Application Service Adapter 80'.

In accordance with the embodiment containing Directed Dictation through the human machine interface (HMI) provided between the User 22' and the User Interface Device (not shown), there is established by Application Service Adapter 80' a bi-directional communication link between User 22' and the System Transaction Manager 30.' In accordance with this embodiment, the User 22' by interface with the User Interface Device constrains or otherwise restricts parameters for the subject matter and content of the dictated Speech. For example, prompts on the User Interface Device specify the type of dictation required. The prompts on the User Interface Device can be provided by the legacy User protocol System and/or the System Transaction Manager. The ASA 80' interface in this embodiment collects and stores appropriate data related to these prompts such as the position of the caret on the User Interface Device and translation of the relationship between caret placements to provide the System Transaction Manager with information concerning the requirements for Constrained Recognition and/or Structured Transcription.

The Application Service Adapter 80' is an application layer that provides, among other things, bi-directional translation among the Native Application Protocol 154, the Native Communications Protocol 156, and a uniform System protocol 158 utilized by the System Transaction Manager 30'. A transport layer 160 transfers the resulting SIR to the System Transaction Manager 30' via, for example, streaming (Real Time or near Real Time) output.

As noted above, an ASR 32' responds to the SIR by generating a Response to the SIR. Following the generation and receipt of the Response from the System Transaction Manager 30', the Application Service Adapter 80' converts the Response so that it is compatible with the Native Application Protocol 154. The Requesting User 22' can then employ the application 152 to correct and to manipulate the Response, which includes a transcription of the Speech in, for example, Rich Text Format (RTF), as well as the original Speech (e.g., recorded voice wave data) or modified Speech (e.g., compressed and/or filtered, enhanced, or the like, recorded voice wave data). Following correction, the User 22' can submit the transcription to the Application Service Adapter 80' for updating its User Profile, for storing in a site-specific document Database, and so on.

The Application Service Adapter 80' can convert SIRs, Responses, and the like using any mechanism, including API services 96, cutting and pasting information in a clipboard maintained by the application's 152 operating system, or transmitting characters in ASCII, EBCDIC, UNICODE formats, and the like. Job information includes identifications of the User Profile and of the ASR 32'. The Job information can also include preexisting and User-defined language Commands.

The uniform System protocol 158 also packages Jobs containing User corrected transcribed text and wave data, which provide pronunciations of new vocabulary words or words that the ASR 32' could not recognize, and are stored in the User Profile for subsequent use by the User's use of the specified ASR. This information can be stored on the User Database and/or Universal Database and/or ASR Database.

The uniform System protocol 158 compiles much of the Job in cooperation with the User Service Adapter 82'. In addition to Job Routing services, the User Service Adapter 82' also provides an interface for maintaining the User Profile and for updating Job processing settings. The User Service Adapter 82' thus provides services for finalizing a correction of the Response, which allows updating of the User Profile with context information and with a pronunciation guide for words the ASR 32' could not recognize. The User Service Adapter 82' also provides services for creating new User Profiles, for maintaining Commands, for notifying the User of Job status, for modifying the Correctionist Pool configuration, and for archiving documents obtained from processing the Response.

System Transaction Manager

Figure 5:
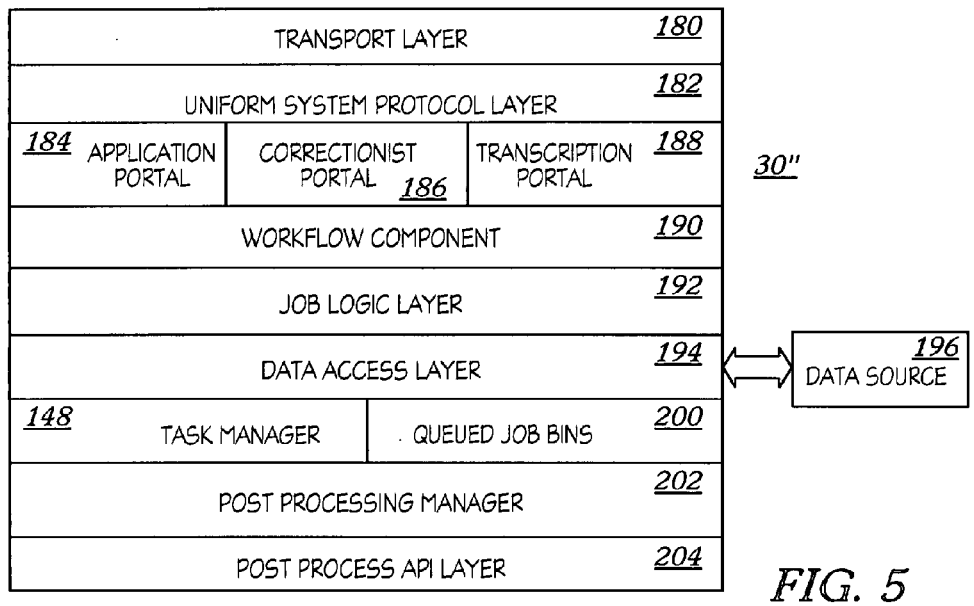
FIG. 5 is a schematic drawing of a System Transaction Manager.

FIG. 5 shows additional features of a System Transaction Manager 30". The System Transaction Manager 30" exchanges information bilaterally with the User interface 150 of FIG. 4 through their respective transport layers 180, 160, as set forth in detail above. Data exchange between the transport layers 160, 180 can occur in Real Time or near Real Time (streaming) or in batch mode, and includes transmission of SIRs and Responses and any other Job related information.

Following receipt of Job information from the transport layer 180, a uniform System protocol layer 182, within the System Transaction Manager 30," decodes the Job information (SIRs) into Meta Data, Commands, and spoken text. The System Transaction Manager 30" routes the Job to an application portal 184, a Correctionist portal 186, or a Speech recognition and transcription portal 188, depending upon processes required and the status of the Job routed, i.e. incoming SIR, Response to be corrected, Response, or the like. The uniform System protocol layer 182 decodes and authenticates each Command in accordance with each specific portal's security requirements. The uniform System protocol layer 182 logs and rejects any Jobs that fail authentication. The System Transaction Manager 30" passes authenticated Jobs to a workflow component 190, which converts Jobs into an instruction set as specified by a Job logic layer 192.

The System Transaction Manager 30" includes a data access layer 194, which stores or accesses any data in data source 196 that is necessary to support a Job. The data access layer 194 converts instructions requesting data into Commands that are specific to a given Database or Databases designated by the Job (e.g. a SQL Server, an Oracle dB, OLE storage, and the like).

As can be seen in FIG. 5, a task manager 148 handles instructions pertaining to submission and retrieval of Jobs, which are placed into queued Job bins 200 to await processing (e.g., transcription of Speech). The task manager 148 adds Jobs to a particular Job bin 200 based on rules from the Job logic layer 192. These rules permit the task manager 148 to match a Job's requirements with processing capabilities associated with a particular Job bin 200 (e.g., language, base vocabulary, topic, User Commands, ASR, pre- and post-processing, and the like). Each Job bin 200 is associated with a set of ASRs. The System Transaction Manager 30" creates or associates Job bins 200 for each networked SRTS 220 (FIG. 6), which may include one or more ASRs, attached to the SRTS, and transfers capability data.

The task manager 148 releases Jobs based on priority rules, including whether an available ASR or SRTS has access to a valid copy of the Requesting User's Profile. Based on rules from the Job logic layer 192, the task manager 148 determines a match between an available ASR and a Job awaiting processing in queued Job bins 200. The task manager 148 releases Jobs for processing only when each of the rules is satisfied. Such rules include parameters detailing how to process a Job, which the task manager 148 compares with the capabilities of particular ASRs. The task manager 148 also processes pre- and post-processing of Jobs and cleanup of error conditions resulting from network interruptions, equipment failure, poor dictation audio, and the like.

In order to satisfy rules imposed by the Job logic layer 192 or Commands submitted by the Requesting User 22', the System Transaction Manager 30" flags certain Jobs for post-processing. Post-processing allows for additional operations to be performed on a Job by, for example, allowing any User specific and/or automated System processing of the Job, including Formatted Transcription which can be, for example, carried out by the Audio Preprocessor. A post-processing manager 202 adds the flagged Jobs (e.g., Responses) to a post-processing Job queue (not shown). When a post-processor (which may be on any system in the network) becomes available, the post-processing manager 202 releases Jobs singly or in batch, depending on the requirements of the post-processor. For each post-processor, the post-processing manager 202 loads a component in the System, which the post-processing manager 202 retains until the post-processor detaches. Each post-processor identifies what Jobs or Commands it will operate on by providing the System Transaction Manager 30" with Job type specifications. As can be seen in FIG. 5, a post-processing Application Programming Interface (API) layer 204 provides a common path for extracting Job data from the System Transaction Manager 30", which the post-processor can use for post-processing.

Speech Recognition and Transcription

Figure 6:
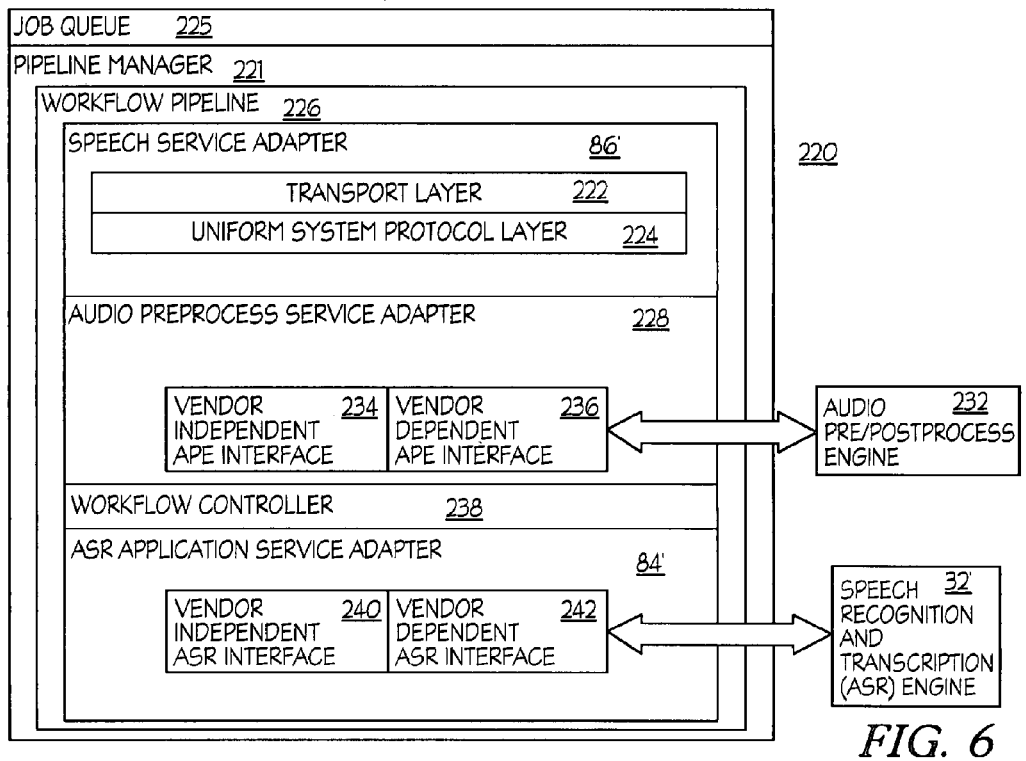
FIG. 6 is a schematic drawing of a Speech Recognition and Transcription Server (SRTS).

FIG. 6 provides a functional description of a Speech Recognition and Transcription Server (SRTS) 220, which includes an ASR 32" for automatically transcribing SIRs. Although FIG. 6 shows a SRTS 220 having a single ASR 32', the SRTS 220 could include multiple ASR.

The SRTS 220 exchanges information with the System Transaction Manager 30" of FIG. 5 through their respective transport layers 222, 180 using a uniform System protocol 224, 182. Data exchange between the transport layers 222, 180 can occur in Real Time or near Real Time (streaming) or in batch mode, and includes transmission of SIRs, Responses, and any other Job related information, including User Profile Updates.

The SRTS 220 includes a pipeline (connection interface) manager 221, which manages one or more workflow pipelines 226, which control processing of Jobs. Each of the workflow pipelines 226 is coupled to a specific ASR 32' via a Speech Recognition Service Adapter 84'. When a particular workflow pipeline 226 becomes available to process a Job, it notifies the System Transaction Manager 30" (FIG. 5) via the transport layer 222. Upon its receipt within the appropriate workflow pipeline 226, the Job is stored in the local Job queue 225, while it undergoes processing.

Processing includes a pre-process step which can comprise validation of the Job, synchronization of a Job specific User Profile with a local cached version, and synchronization of a User specific Database containing dictation Commands, training information and the like.

The service adapter associated with the Audio Preprocessor is comprised of a vendor independent APE interface 234 and a vendor dependent APE interface 236 which provides the linkage to an external audio pre/post process engine (APE) 232. The audio pre\post process engine 232 can reside on the SRTS 220 or a peer-to-peer network and/or the cloud, as specifically described above. An audio preprocess adapter 228 extracts the audio portion from the Job and loads an appropriate audio pre\post process engine 232, which prepares the audio stream in accordance with the Commands contained within the Job or the inserted into the audio stream itself.

The workflow controller 238 operates on audio pre/post preprocess engine 232 output. In one embodiment, the workflow controller 238 loads, configures, and starts the automated Speech Recognition Service Adapter 84' to process Audio Data as a single data stream. In other embodiments, the workflow controller 238 creates a task list, which references ASR application service adapters associated with separate ASRs 32'. In such embodiments, the workflow controller 238 configures each of the ASR application service adapters to process various segments that the audio pre/post process engine 232 has marked, for processing by the separate ASR 32'. The latter embodiment allows for selecting separate ASR 32' for speech-to-text processing and for speech-to-command processing. Commands can be executed in Real Time or near Real Time, or converted into a script for batch mode post processing.

In any case, the workflow controller 238 loads, configures, and starts the ASR Application Service Adapter 84' to begin processing a Job. As can be seen in FIG. 6, the ASR Application Service Adapter 84' includes a vendor independent ASR interface 240, which provides the System Transaction Manager 30" with ASR 32" settings and with Job information to assist in determining the appropriate ASR 32" to process a given Job. The vendor independent ASR interface 240 also creates a vendor dependent ASR interface 242 object and passes the ASR settings, as well as any other data necessary to process the Job to the System Transaction Manager 30" (FIG. 5). The vendor dependent ASR interface 242 initializes the ASR 32" with ASR specific process settings and with preprocessed audio data from the audio pre/post process engine 232, which the ASR 32" transcribes in accordance with the process settings.

The above description is intended to be illustrative and not restrictive. Many embodiments and many applications besides the examples provided would be apparent to those of skill in the art upon reading the above description. The scope of the invention should therefore be determined, not with reference to the above description, but should instead be determined with reference to the appended claims, along with the full scope of equivalents to which such claims are entitled. The disclosures of all articles and references, including patents, patent applications and publications, are incorporated by reference in their entirety and for all purposes.

The invention claimed is:

1. A system for facilitating speech recognition and transcription, the system comprising:
at least one transaction manager configured to utilize a uniform system protocol to receive a first request from a first user employing a first protocol different from the uniform system protocol, the transaction manager further configured to route a first response to a second user employing a second protocol different from the uniform system protocol, the first response comprised of recognized spoken text;
at least one interface in communication with the at least one transaction manager and supporting dictation applications; and
at least one speech engine in communication with the at least one transaction manager and configured to receive a second request from the at least one transaction manager and to transmit a second response containing the recognized spoken text to the at least one transaction manager.

2. The system of claim 1, wherein the first request is a speech information request.

3. The system of claim 1, wherein the recognized spoken text comprises transcribed spoken text.

4. The system of claim 1, wherein the interface is an application service adapter providing bi-directional communication and translation between the first protocol and the uniform system protocol.

5. The system of claim 4, wherein the application service adapter further provides bi-directional communication and translation between the uniform system protocol and the second protocol.

6. The system of claim 1, wherein the first request from the first user employing the first protocol originates at a hand held device capable of recording speech.

7. The system of claim 1, wherein the first response from the system transaction manager is received by the second user employing the second protocol at a hand held device capable of displaying the transcribed spoken text in a user application.

8. The system of claim 1, wherein the first protocol is different than the second protocol.

9. The system of claim 1, wherein the first user is different than the second user.

10. A method for facilitating speech recognition and transcription, the method comprising:
receiving at a transaction manager configured to utilize a uniform system protocol a first request from a first user, the first request formatted according to a first protocol different from the uniform system protocol, and the first request being received at the transaction manager across an interface supporting dictation applications and in communication with the transaction manager;
receiving, at a speech engine in communication with the transaction manager, a second request from the transaction manager, and transmitting from the speech engine to the transaction manager a first response containing recognized spoken text; and
routing, by the transaction manager, a second response to a second user employing a second protocol different from the uniform system protocol, the second response comprised of the recognized spoken text.

11. The method of claim 10, wherein the first request is a speech information request.

12. The method of claim 10, wherein the recognized spoken text comprises transcribed spoken text.

13. The method of claim 10, wherein the interface provides bi-directional communication between the first protocol and the uniform system protocol.

14. The method of claim 10, wherein the first request from the first user employing the first protocol originates at a hand held device capable of recording speech.

15. The method of claim 10, wherein the first protocol is different than the second protocol.

16. The method of claim 10, wherein the first user is different than the second user.

17. The method of claim 10, further comprising receiving the second response by the second user employing the second protocol at a hand held device and displaying the transcribed spoken text in a user application executing on the hand held device.

18. A non-transitory computer-readable medium storing computer-executable instructions, which instructions, when executed by a processor, cause the processor to perform steps comprising:
configuring a transaction manager executing on the processor and configured to utilize a uniform system protocol to receive, across an interface supporting dictation applications in communication with the transaction manager, a first request formatted according to a first protocol different from the uniform system protocol from a first user;
cause the transaction manager to transmit a second request to a speech engine in communication with the transaction manager, and receive from the speech engine a first response containing recognized spoken text; and
cause the transaction manager to route a second response to a second user employing a second protocol different from the uniform system protocol, the second response comprised of the recognized spoken text.

19. The non-transitory computer-readable medium of claim 18, wherein the first request is a speech information request.

20. The non-transitory computer-readable medium of claim 18, wherein the recognized spoken text comprises transcribed spoken text.

21. The non-transitory computer-readable medium of claim 18, wherein the interface is an application service adapter providing bi-directional communication between the first protocol and the uniform system protocol.

22. The non-transitory computer-readable medium of claim 18, wherein the first request from the first user employing the first protocol originates at a hand held device capable of recording speech.

23. The non-transitory computer-readable medium of claim 18, wherein the first protocol is different than the second protocol.

* * * * *